US012705188B2

(12) United States Patent
Li et al.

(10) Patent No.: US 12,705,188 B2
(45) Date of Patent: Aug. 11, 2026

(54) METHOD FOR EXTENDING MEMORY ISOLATION DOMAIN, AND ELECTRONIC DEVICE

(71) Applicant: Huawei Technologies Co., Ltd., Shenzhen (CN)

(72) Inventors: Wentai Li, Shanghai (CN); Jinyu Gu, Shanghai (CN); Haibo Chen, Shanghai (CN); Kang Sun, Moscow (RU)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 51 days.

(21) Appl. No.: 19/013,391

(22) Filed: Jan. 8, 2025

(65) Prior Publication Data

US 2025/0147900 A1 May 8, 2025

Related U.S. Application Data

(63) Continuation of application No. PCT/CN2023/103856, filed on Jun. 29, 2023.

(30) Foreign Application Priority Data

Jul. 8, 2022 (CN) ......................... 202210800902.8

(51) Int. Cl.
*G06F 12/14* (2006.01)
*G06F 9/50* (2006.01)

(52) U.S. Cl.
CPC ........ *G06F 12/1483* (2013.01); *G06F 9/5016* (2013.01); *G06F 12/145* (2013.01)

(58) Field of Classification Search
CPC .. G06F 12/1483; G06F 9/5016; G06F 12/145; G06F 2212/657; G06F 12/1009;
(Continued)

(56) References Cited

U.S. PATENT DOCUMENTS 9,910,611 B2 * 3/2018 Koufaty .................. G06F 12/08
11,003,597 B2 5/2021 Zhang et al.
(Continued)

FOREIGN PATENT DOCUMENTS

CA 2897747 A1 * 8/2014 ............. G06F 21/53
CN 107368739 A * 11/2017 ......... G06F 9/45533
(Continued)

*Primary Examiner* — John B King
(74) *Attorney, Agent, or Firm* — Conley Rose, P.C.

(57) ABSTRACT

A method for extending a memory isolation domain includes allocating memories of multiple isolation domains, where the multiple isolation domains are in a correspondence with N protection keys and M extended page tables. When a first application is allowed to access a memory of a first isolation domain, the method further includes determining, based on the correspondence, a first protection key and a first extended page table that correspond to the first isolation domain, where the multiple isolation domains include the first isolation domain, the N protection keys include the first protection key, and the M extended page tables include the first extended page table. The method further includes enabling access permission for the first isolation domain based on the first protection key and the first extended page table, for the first application to access the memory of the first isolation domain.

18 Claims, 17 Drawing Sheets

(58) Field of Classification Search
CPC ............... G06F 12/109; G06F 12/1475; G06F 2212/1052; G06F 21/78; G06F 21/53; G06F 21/74
See application file for complete search history.

(56) References Cited

U.S. PATENT DOCUMENTS

| | | | | |
|---|---|---|---|---|
| 2009/0172341 | A1* | 7/2009 | Durham | G06F 9/461 711/E12.059 |
| 2012/0255015 | A1* | 10/2012 | Sahita | G06F 21/54 717/130 |
| 2014/0189194 | A1* | 7/2014 | Sahita | G06F 12/109 711/6 |
| 2017/0286326 | A1 | 10/2017 | Guim et al. | |
| 2020/0409734 | A1 | 12/2020 | Sahita et al. | |
| 2021/0109870 | A1 | 4/2021 | Sahita et al. | |

FOREIGN PATENT DOCUMENTS

| | | | | | |
|---|---|---|---|---|---|
| CN | 107516052 | A | | 12/2017 | |
| CN | 109933441 | A | * | 6/2019 | G06F 21/53 |
| CN | 113064697 | A | | 7/2021 | |
| CN | 114217882 | A | | 3/2022 | |

* cited by examiner

Page table 1 (in use)

| VA | PA | Permission |
|---|---|---|
| VA-0 | PA-0 | Read/Write |
| VA-1 | NULL | - |

Current permission

Page table switching

Page table 2 (waiting for switching)

| VA | PA | Permission |
|---|---|---|
| VA-0 | NULL | - |
| VA-1 | PA-1 | Read/Write |

Permission after switching

FIG. 5

S1501: Query a protection key corresponding to an isolation domain ID for which a memory is forbidden to be accessed S1502: Cancel access permission for the isolation domain by setting a protection key register (a) NGINX. X-axis: request size (bytes)

(b) Memcached SET. X-axis: user number (c) Memcached GET. X-axis: user number

METHOD FOR EXTENDING MEMORY ISOLATION DOMAIN, AND ELECTRONIC DEVICE

CROSS-REFERENCE TO RELATED APPLICATIONS

This is a continuation of Int'l Patent App. No. PCT/CN2023/103856, filed on Jun. 29, 2023, which claims priority to Chinese Patent App. No. 202210800902.8, filed on Jul. 8, 2022, which are incorporated by reference.

TECHNICAL FIELD

Embodiments of this disclosure relate to the field of memory isolation, and more specifically, to a method for extending a memory isolation domain, and an electronic device.

BACKGROUND

When a common process is running, all memories can be accessed in the process. Due to a lack of a memory isolation mechanism in the process, a memory error in the process usually causes serious consequences. To resolve this problem, fine-grained memory permission control can be performed in the process by using a memory isolation technology, so that when an error occurs during process running or the process is attacked, a memory-related exception can be limited to a specific area. Therefore, the intra-process memory isolation technology can effectively improve application security and reliability.

SUMMARY

This disclosure provides a method for extending a memory isolation domain and an electronic device. In the method, an extended page table is introduced into a protection key technology, so that a quantity of available isolation domains can be effectively increased. In addition, in the method, a fast switching feature of a memory protection key is used, so that performance overheads of an application can be reduced.

According to a first aspect, a method for extending a memory isolation domain is provided. The method includes: allocating memories of multiple isolation domains, where the multiple isolation domains are in a correspondence with N protection keys, and the multiple isolation domains are in a correspondence with M extended page tables, where N and M are positive integers, and at least one of N and M is greater than 1; when a first application is allowed to access a memory of a first isolation domain, determining, based on the correspondence, a first protection key and a first extended page table that correspond to the first isolation domain, where the multiple isolation domains include the first isolation domain, the N protection keys include the first protection key, and the M extended page tables include the first extended page table; and enabling access permission for the first isolation domain based on the first protection key and the first extended page table, for the first application to access the memory of the first isolation domain.

Optionally, each isolation domain may correspond to an identifier (ID) of the isolation domain, IDs of multiple isolation domains are in a correspondence with the N protection keys, and IDs of multiple isolation domains are in a correspondence with the M extended page tables, where N and M are positive integers, and at least one of N and M is greater than 1.

In other words, the ID of the isolation domain is mapped to the protection key corresponding to the isolation domain and the extended page table corresponding to the isolation domain.

Correspondingly, it may be: determining, based on an ID of the first isolation domain, the first protection key and the first extended page table that correspond to the first isolation domain.

The extended page table is a page table in a host kernel.

Optionally, one extended page table may include multiple isolation domains.

One extended page table may include a maximum of 15 isolation domains, in other words, a quantity of isolation domains that use same extended page tables is at most 15.

In addition, because a virtual machine function extended page table switching hardware mechanism can support a maximum of 512 extended page tables, the method for extending a memory isolation domain provided in embodiments of this disclosure can support a maximum of 7680 (512×15) isolation domains.

The memory of the isolation domain is located in the isolation domain.

Optionally, the memory of the isolation domain may also be referred to as an isolation domain memory, or may be referred to as another name indicating the memory of the isolation domain. This is not limited in this disclosure.

The ID of the isolation domain is mapped to the protection key corresponding to the isolation domain and the extended page table corresponding to the isolation domain, which may be understood as that each isolation domain is allocated with one protection key and one extended page table.

Optionally, the multiple isolation domains may share one protection key, and the multiple isolation domains correspond to different extended page tables.

Optionally, the multiple isolation domains may share one extended page table, and the multiple isolation domains correspond to different protection keys.

In embodiments of this disclosure, an extended page table is introduced into a protection key technology, so that a quantity of available isolation domains can be effectively increased. In addition, in the method, a fast switching feature of a memory protection key is used, so that performance overheads of an application can be reduced.

With reference to the first aspect, in a possible implementation, the enabling access permission for the first isolation domain includes: when the first extended page table corresponding to the first isolation domain is the same as a current extended page table, enabling the access permission for the first isolation domain by setting a protection key register; or when the first extended page table corresponding to the first isolation domain is different from a current extended page table, switching the current extended page table to the first extended page table, and enabling the access permission for the first isolation domain by setting a protection key register.

The current extended page table is an extended page table that is currently in a used state (has been allocated), and the first extended page table that corresponds to the first isolation domain and that is determined based on the correspondence may be understood as an extended page table that is to be used (to be allocated).

Optionally, the setting of the protection key register described above may be writing the read/write permission into the protection key register.

It should be understood that a solution involved in this implementation may be referred to as an affinity design, that is, because switching on the extended page table is not performed when an extended page table corresponding to an isolation domain is the same as the current extended page table, the protection key register only needs to be modified (set) in most memory isolation domains during permission switching.

In embodiments of this disclosure, the affinity design is introduced, so that the protection key register only needs to be modified (set) in most memory isolation domains during permission switching, and a delay of protection key switching is less than a delay of extended page table switching. In this way, only a small amount of high-delay extended page table switching is introduced. Therefore, a fast switching feature of a memory protection key is used, and performance overheads of an application can be reduced.

With reference to the first aspect, in a possible implementation, the allocating memories of multiple isolation domains includes allocating the memory of the first isolation domain, and the allocating the memory of the first isolation domain includes: determining, based on the correspondence, the first protection key corresponding to the first isolation domain and the first extended page table corresponding to the first isolation domain; determining whether the first extended page table already exists; and when it is determined that the first extended page table already exists, establishing, in the first extended page table, a mapping to the memory in the first isolation domain, and setting a protection key of the memory in the page table, where the page table is a page table in a guest kernel; or when it is determined that the first extended page table does not exist, initializing the first extended page table, establishing, in an initialized first extended page table, a mapping to the memory in the first isolation domain, and setting a protection key of the memory in the page table, where the page table is a page table in a guest kernel.

Optionally, each isolation domain corresponds to one ID of the isolation domain, and the first protection key and the first extended page table that correspond to the first isolation domain may be queried based on the ID of the first isolation domain.

The setting the protection key of the memory in the page table may be setting the protection key of the memory as the first protection key in the page table.

In embodiments of this disclosure, mapping relationships (correspondences) between an isolation domain (an ID of the isolation domain) and a protection key and an extended page table that correspond to the isolation domain are established, so that protection key setting in an extended page table and management of multiple extended page tables can be better supported.

With reference to the first aspect, in a possible implementation, the method further includes: when access to the memory of the first isolation domain ends, canceling the access permission for the first isolation domain by setting the protection key register.

The setting the protection key register may be modifying the protection key register, and specifically, deleting the read/write permission in the protection key register.

In embodiments of this disclosure, after memory access ends, the access permission for the isolation domain is canceled by setting the protection key register, so that the memory can be isolated and protected in time.

With reference to the first aspect, in a possible implementation, before the allocating memories of multiple isolation domains, the method further includes: initializing the isolation domain.

In an implementation, the initializing the isolation domain includes: generating an ID of the isolation domain; allocating the protection key corresponding to the isolation domain and the extended page table corresponding to the isolation domain to the ID of the isolation domain; and recording a mapping from the ID of the isolation domain to the protection key and the extended page table.

Optionally, the mapping from the ID of the isolation domain to the protection key and the extended page table is recorded in a user-mode library by the user-mode library.

Because the isolation domain is in a correspondence with the ID of the isolation domain, the mapping from the ID of the isolation domain to the protection key and the extended page table may be understood as a mapping from the isolation domain to the protection key and the extended page table.

Optionally, initializing the isolation domain may be initializing multiple isolation domains, or may be initializing some of the multiple isolation domains.

Initializing the first isolation domain is used as an example. A specific initialization process may be: generating the ID of the first isolation domain; allocating the first protection key and the first extended page table to the ID of the first isolation domain; and recording a mapping from the ID of the first isolation domain to the first protection key and the first extended page table.

Optionally, in an implementation, the allocating the protection key and the extended page table to the ID of the isolation domain includes: determining whether the current extended page table is capable of accommodating a new protection key; and when it is determined that the current extended page table is capable of accommodating a new protection key, allocating the current extended page table to the ID of the isolation domain, and allocating, in the current extended page table, an unused protection key to the ID of the isolation domain; or when it is determined that the current extended page table is incapable of accommodating a new protection key, allocating a new extended page table to the ID of the isolation domain, and allocating, in the new extended page table, an unused protection key to the ID of the isolation domain.

The current extended page table is an extended page table that is currently in a used state, and the extended page table that is currently in the used state corresponds to another isolation domain.

For example, a specific process of allocating the first protection key and the first extended page table to the ID of the first isolation domain may be: determining whether the current extended page table is capable of accommodating a new protection key; and when it is determined that the current extended page table is capable of accommodating a new protection key, allocating the current extended page table as the first extended page table to the ID of the first isolation domain, and allocating, in the current extended page table, an unused protection key as the first protection key to the ID of the first isolation domain; or when it is determined that the current extended page table is incapable of accommodating a new protection key, allocating a new extended page table as the first extended page table to the ID of the first isolation domain, and allocating, in the new extended page table, an unused protection key as the first protection key to the ID of the first isolation domain.

In embodiments of this disclosure, before the extended page table used to protect the permission for the memory isolation domain switches the access permission for the isolation domain, the corresponding isolation domain is initialized. This can avoid a scalability problem caused by a large quantity of state changes generated by size expansion of the isolation domain, and reduce performance overheads generated in a memory access process.

With reference to the first aspect, in a possible implementation, the accessing the memory of the first isolation domain includes: determining whether a virtual machine exception is triggered to enter the guest kernel; and when it is determined that a virtual machine exception is not triggered to enter the guest kernel, accessing the memory of the first isolation domain.

With reference to the first aspect, in a possible implementation, the accessing the memory of the first isolation domain includes: determining whether a virtual machine exception is triggered to enter the guest kernel; when it is determined that a virtual machine exception is triggered to enter the guest kernel, further determining whether the memory of the first isolation domain is allowed to be accessed; when it is determined that the memory of the first isolation domain is allowed to be accessed, switching, in the guest kernel, the extended page table and the protection key to the first extended page table and the first protection key that correspond to the memory of the first isolation domain; and accessing the memory of the first isolation domain.

Optionally, the determining whether the memory of the first isolation domain is allowed to be accessed includes: generating and maintaining an accessible isolation domain list; and determining, based on the accessible isolation domain list, whether the memory of the first isolation domain is allowed to be accessed.

In embodiments of this disclosure, a virtual machine exception mechanism is used to support simultaneous access to multiple isolation domain memories. After memory access across an extended page table isolation domain occurs, the triggered exception can be processed in the guest kernel. The isolation domain is switched in a slow path, so that the application can simultaneously access and use isolation domains of multiple extended page tables.

With reference to the first aspect, in a possible implementation, the method further includes: releasing the memory of the isolation domain.

Optionally, the releasing the memory of the isolation domain includes: determining, based on the correspondence, a protection key corresponding to the memory and an extended page table corresponding to the isolation domain; removing the protection key corresponding to the memory from the page table; and removing the mapping to the memory from the extended page table.

It should be understood that the determining, based on the foregoing correspondence, the protection key corresponding to the memory and the extended page table corresponding to the isolation domain may also be described as: querying/determining, based on the ID of the isolation domain, the protection key corresponding to the memory and the extended page table corresponding to the isolation domain; removing the protection key corresponding to the memory from the page table; and removing the mapping to the memory from the extended page table.

It should be understood that the foregoing memory is a to-be-released memory.

Optionally, removing the mapping to the memory may be mapping the memory to a null address.

Releasing the memory of the first isolation domain is used as an example, a specific process may be: determining, based on the correspondence, a first protection key and a first extended page table that correspond to the memory; removing the first protection key corresponding to the memory from the page table; and removing the mapping to the memory from the first extended page table.

It should be understood that even if all memory protection keys in the extended page table are not allocated to any isolation domain, the extended page table is not destroyed. In this way, destruction of the extended page table can be avoided, and overheads of re-initializing the extended page table subsequently can be avoided.

In embodiments of this disclosure, when the memory of the isolation domain needs to be released, a mapping relationship between a protection key and an extended page table that correspond to the isolation domain memory can be canceled in time. In this way, the protection key and the extended page table can be released in time, so that the protection key and the extended page table can be reused.

With reference to the first aspect, in a possible implementation, the method further includes: releasing the isolation domain.

Optionally, the releasing the isolation domain includes: determining, based on the correspondence, a protection key corresponding to the isolation domain and an extended page table corresponding to the isolation domain; marking the protection key corresponding to the isolation domain as being in an unallocated state; and releasing the ID of the isolation domain.

It should be understood that the determining, based on the foregoing correspondence, the protection key corresponding to the isolation domain and the extended page table corresponding to the isolation domain may also be described as: querying/determining, based on the ID of the isolation domain, the protection key corresponding to the isolation domain and the extended page table corresponding to the isolation domain.

Releasing a first isolation domain is used as an example. A specific process may be: determining, based on the correspondence, a first protection key corresponding to the first isolation domain and a first extended page table corresponding to the first isolation domain; marking the first protection key corresponding to the first isolation domain as being in an unallocated state; and releasing an ID of the first isolation domain.

In embodiments of this disclosure, when a release requirement of the isolation domain is received, in the extended page table, a protection key is marked as being in an unallocated state. Subsequently, when a new isolation domain is allocated, the protection key in the unallocated state may be reused. In addition, after an ID of the isolation domain is released, the ID may be reused when a new isolation domain is allocated.

According to a second aspect, an electronic device is provided. The electronic device includes a memory and a processor, the memory is configured to store computer program code, and the processor is configured to execute the computer program code stored in the memory, to implement the method according to any one of the first aspect or the possible implementations of the first aspect.

According to a third aspect, a chip is provided. The chip stores instructions, and when the instructions run on a device, the chip is enabled to perform the method according to any one of the first aspect or the possible implementations of the first aspect.

According to a fourth aspect, a computer-readable storage medium is provided. The computer-readable storage medium stores a computer program or instructions. When the computer program or the instructions is/are executed, the method according to any one of the first aspect or the possible implementations of the first aspect is implemented.

BRIEF DESCRIPTION OF DRAWINGS

FIG. 5 is a diagram of a page table switching technology;

DESCRIPTION OF EMBODIMENTS

The following describes technical solutions of this disclosure with reference to accompanying drawings. Clearly, the described embodiments are only some but not all embodiments of this disclosure.

The following describes the technical solutions in embodiments of this disclosure with reference to the accompanying drawings in embodiments of this disclosure. In description in embodiments of this disclosure, "/" means "or" unless otherwise specified. For example, A/B may indicate A or B. In this specification, "and/or" describes only an association relationship for describing associated objects and indicates that three relationships may exist. For example, A and/or B may indicate the following three cases: only A exists, both A and B exist, and only B exists. In addition, in the description of embodiments of this disclosure, "multiple" or "a plurality of" means two or more than two.

The terms "first" and "second" mentioned below are only intended for a purpose of description, and shall not be understood as an indication or implication of relative importance or implicit indication of the number of indicated technical features. Therefore, a feature limited by "first" or "second" may explicitly or implicitly include one or more features. In the description of embodiments, unless otherwise specified, "a plurality of" means two or more.

A method provided in embodiments of this disclosure may be applied to an electronic device like a mobile phone, a tablet computer, a wearable device, a vehicle-mounted device, an augmented reality (AR) device/a virtual reality (VR) device, a notebook computer, an ultra-mobile personal computer (UMPC), a netbook, or a personal digital assistant (PDA). A specific type of the electronic device is not limited in embodiments of this disclosure.

The following first describes in detail some terms used in embodiments of this disclosure.

1. Memory Isolation Domain

A memory isolation domain method is a memory isolation mechanism and method in a process. Before and after an application accesses an isolation domain, an application needs to explicitly grant and reclaim permission to access an isolation domain, to prevent the application from accessing the memory of the isolation domain incorrectly due to a memory exception. This improves memory security.

2. Virtualization

A single physical hardware resource is abstracted into multiple virtual resources for resource sharing.

3. Guest and Host Machine

The virtualization technology can be used to construct an environment for running a complete operating system. A system running in a virtualization environment is referred to as a guest, or a virtual machine. A system that controls a guest and provides a virtual environment for the guest is referred to as a host machine.

Figure 1:
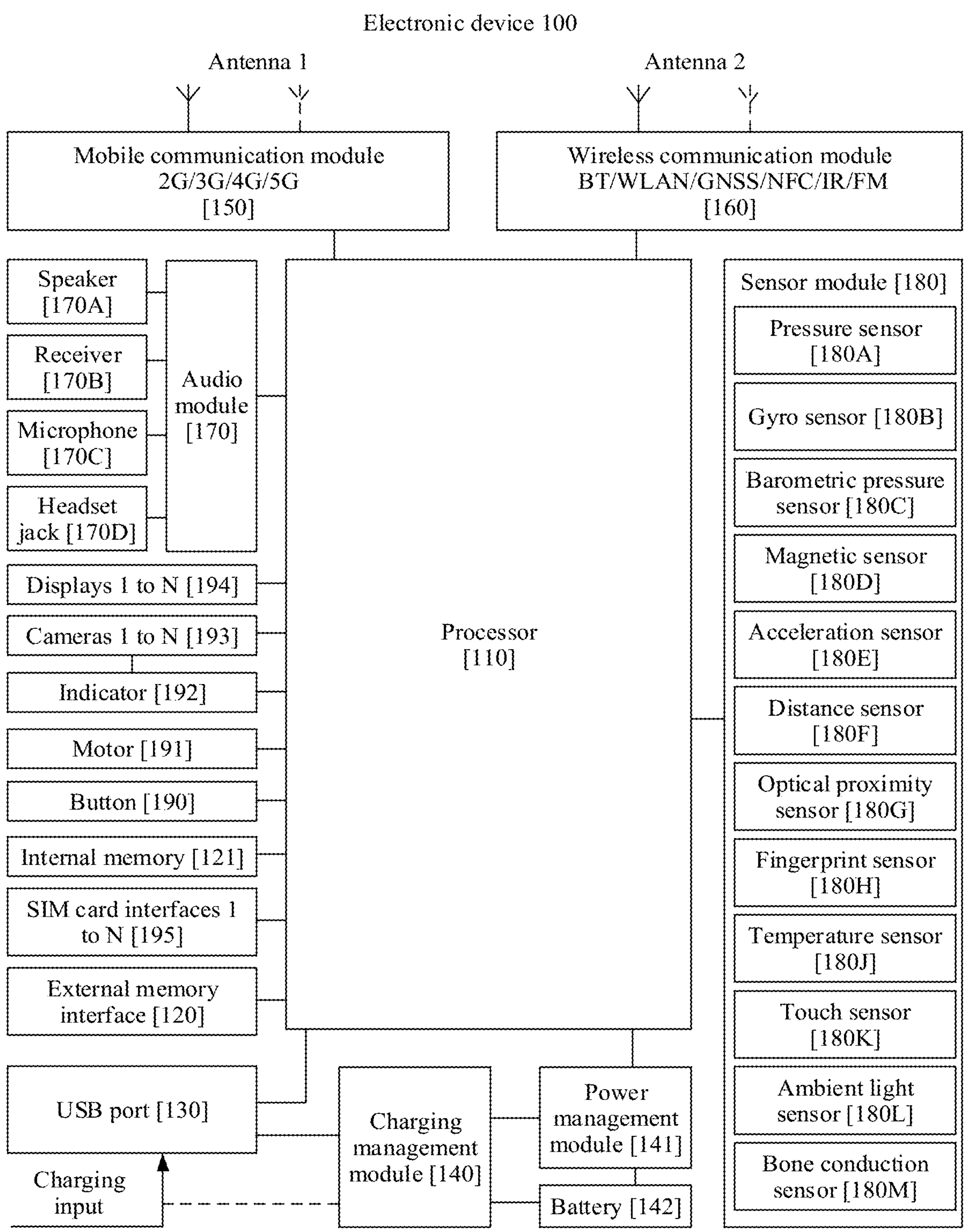
FIG. 1 is a diagram of a structure of an electronic device 100 according to an embodiment.

For example, FIG. 1 is a diagram of a structure of an electronic device 100. The electronic device 100 may include a processor 110, an external memory interface 120, an internal memory 121, a universal serial bus (USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in embodiments of this disclosure does not constitute a specific limitation on the electronic device 100. In some other embodiments of this disclosure, the electronic device 100 may include more or fewer components than those shown in the figure, or a combination of a part of the components, or splits from a part of the components, or an arrangement of different components. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors.

The controller may be a nerve center and a command center of the electronic device 100. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data that has been recently used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse-code modulation (PCM) interface, a universal asynchronous receiver/transmitter (UART) interface, a mobile industry processor interface (MIPI), a general-purpose input/output (GPIO) interface, a subscriber identity module (SIM) interface, a USB port, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a BLUETOOTH headset.

The PCM interface may also be used to perform audio communication, and sample, quantize, and encode an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through a BLUETOOTH headset. Both the I2S interface and the PCM interface may be used for audio communication.

The UART interface is a universal serial data bus, and is configured to perform asynchronous communication. The bus may be a two-way communication bus. The bus converts data to be transmitted between serial communication and parallel communication. In some embodiments, the UART interface is usually configured to connect the processor 110 to the wireless communication module 160. For example, the processor 110 communicates with a BLUETOOTH module in the wireless communication module 160 through the UART interface, to implement a BLUETOOTH function. In some embodiments, the audio module 170 may transmit an audio signal to the wireless communication module 160 through the UART interface, to implement a function of playing music through a BLUETOOTH headset.

The MIPI interface may be configured to connect the processor 110 to a peripheral device such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB port 130 is a port that conforms to a USB standard specification, and may be specifically a mini USB port, a micro USB port, a USB Type-C port, or the like. The USB port 130 may be configured to connect to a charger to charge the electronic device 100, or may be configured to transmit data between the electronic device 100 and a peripheral device, or may be configured to connect to a headset for playing audio through the headset. The port may be configured to connect to another electronic device, for example, an AR device.

It can be understood that an interface connection relationship between modules illustrated in this embodiment of this disclosure is only an illustrative description, and does not constitute a limitation on a structure of the electronic device 100. In some other embodiments of this disclosure, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB port 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display 194, the camera 193, the wireless communication module 160, and the like. The power management module 141 may be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, an antenna may be used in combination with a tuning switch.

The mobile communication module 150 may provide a wireless communication solution that is applied to the electronic device 100 and that includes a 2G/3G/4G/5G or the like. The mobile communication module 150 may include at least one filter, a switch, a power amplifier, a low-noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (not limited to the speaker 170A, the receiver 170B, and the like), and displays an image or a video through the display 194. In some embodiments, the modem processor may be an independent device. In some other embodiments, the modem processor may be independent of the processor 110, and is disposed in a same device as the mobile communication module 150 or another functional module.

The wireless communication module 160 may provide a wireless communication solution that is applied to the electronic device 100 and that includes a wireless local area network (WLAN) (for example, a WI-FI network), BLUETOOTH (BT), a global navigation satellite system (GNSS), frequency modulation (FM), a near-field communication (NFC) technology, an infrared (IR) technology, or the like. The wireless communication module 160 may be one or more devices integrating at least one communications processor module. The wireless communication module 160 receives an electromagnetic wave by the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a Global System for Mobile Communications (GSM), a general packet radio service (GPRS), code-division multiple access (CDMA), wideband CDMA (WCDMA), time-division synchronous CDMA (TD-SCDMA), Long-Term Evolution (LTE), BT, a GNSS, a WLAN, NFC, FM, an IR technology, and/or the like. The GNSS may include a Global Positioning System (GPS), a global navigation satellite system (GLONASS), a BeiDou navigation satellite system (BDS), a quasi-zenith satellite system (QZSS), and/or a satellite-based augmentation system (SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid-crystal display (LCD), a light-emitting diode (LED) such as an organic LED (OLED), an active-matrix OLED (AMOLED), a flexible LED (FLED), a mini-LED, a micro-LED, a micro-OLED, a quantum dot LED (QLED), or the like. In some embodiments, the electronic device 100 may include one or N displays 194, where N is a positive integer greater than 1.

The electronic device 100 may implement a photographing function through the camera 193, the ISP, the video codec, the GPU, the display 194, the application processor and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scene. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, red, green, and blue (RGB) or a luma (Y) component and two chroma (U and V) components (YUV). In some embodiments, the electronic device 100 may include one or N cameras 193, where Nis a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. Therefore, the electronic device 100 may play or record videos in a plurality of coding formats, for example, Moving Picture Experts Group (MPEG)-1, MPEG-2, MPEG-3, and MPEG-4.

The NPU is a neural-network (NN) computing processor. The NPU quickly processes input information by drawing on a structure of a biological neural network, for example, by drawing on a transfer mode between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be used to connect to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an app required by at least one function (for example, a sound playing function or an image playing function), and the like. The data storage area may store data (for example, audio data or a phone book) and the like created when the electronic device 100 is used. In addition, the internal memory 121 may include a high-speed random-access memory (RAM), or may include a nonvolatile memory, for example, at least one magnetic disk storage device, a flash storage device, or a universal flash storage (UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be configured to listen to music or answer a hands-free call by using the speaker 170A.

The receiver 170B, also referred to as an "earpiece", is configured to convert an audio electrical signal into a sound signal. When a call is answered or voice information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, implement a directional recording function, and the like.

The headset jack 170D is configured to connect to a wired headset. The headset jack 170D may be the USB port 130, or may be a 3.5 millimeter (mm) Open Mobile Terminal Platform (OMTP) standard interface, or a CTIA standard interface.

The pressure sensor 180A is configured to sense a pressure signal, and can convert the pressure signal into an electrical signal. In some embodiments, the pressure sensor 180A may be disposed on the display 194. There is a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on the SMS message application icon, an instruction for creating a new SMS message is executed.

The gyro sensor 180B may be configured to determine a motion posture of the electronic device 100. In some embodiments, an angular velocity of the electronic device 100 around three axes (that is, axes x, y, and z) may be determined through the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may also be used in a navigation scenario and a motion-sensing game scenario.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking of the flip cover is set based on a detected opening or closing state of the leather case or a detected opening or closing state of the flip cover.

The acceleration sensor 180E may detect accelerations of the electronic device 100 in various directions (usually on three axes). When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scene, the electronic device 100 may measure a distance through the distance sensor 180F to implement quick focusing.

The optical proximity sensor 180G may include, for example, a light-emitting diode (LED) and an optical detector, for example, a photodiode. The light emitting diode may be an infrared light emitting diode. The electronic device 100 emits infrared light by using the light-emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used for automatically unlocking or locking a screen in leather case mode or pocket mode.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy through the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor to determine a type of a touch event. A visual output related to the touch operation may be provided through the display 194. In some other embodiments, the touch sensor 180K may also be disposed on a surface of the electronic device 100 at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in a headset, to obtain a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effect. The motor 191 may also correspond to different vibration feedback effect for touch operations performed on different areas of the display 194. Different application scenarios (for example, a time reminder, information receiving, an alarm clock, and a game) may also correspond to different vibration feedback effect. The touch vibration feedback effect may be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The electronic device 100 interacts with a network through the SIM card, to implement functions such as conversation and data communication. In some embodiments, the electronic device 100 uses an embedded-SIM (eSIM) card, namely, an embedded-SIM card. The eSIM card may be embedded into the electronic device 100, and cannot be separated from the electronic device 100.

It should be understood that a calling card in embodiments of this disclosure includes but is not limited to a SIM card, an eSIM card, a universal subscriber identity module (USIM) card, a universal integrated circuit card (UICC), and the like.

A software system of the electronic device 100 may use a layered architecture, an event-driven architecture, a microkernel architecture, a micro service architecture, or a cloud architecture. In this embodiment of this disclosure, an Android system with a layered architecture is used as an example to describe a software structure of the electronic device 100.

Figure 2:
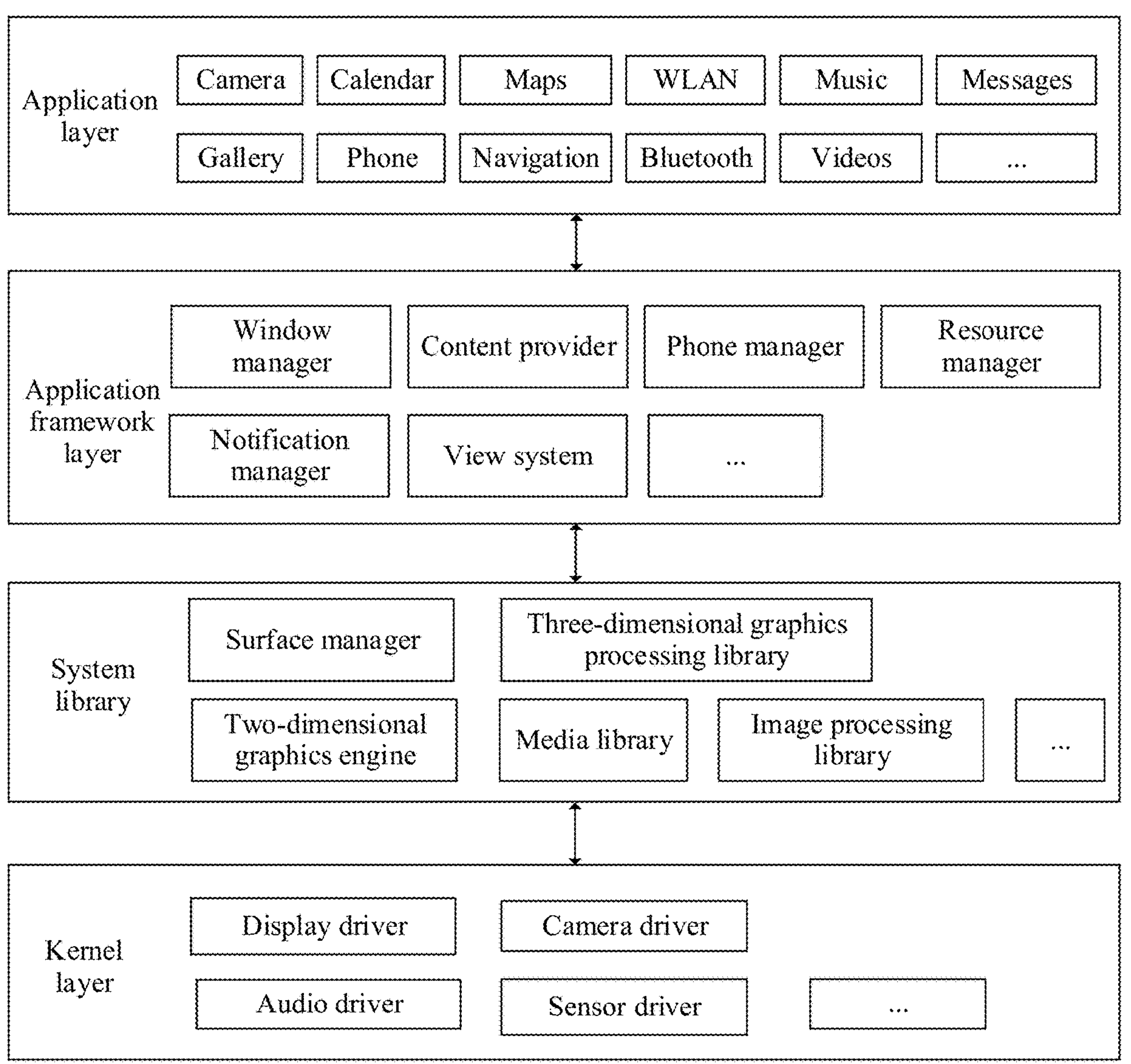
FIG. 2 is a block diagram of a software structure of an electronic device 100 according to an embodiment.

FIG. 2 is a block diagram of the software structure of the electronic device 100 according to this embodiment of this disclosure. In a layered architecture, software is divided into several layers, and each layer has a clear role and task. The layers communicate with each other through a software interface. In some embodiments, the Android system is divided into four layers: an application layer, an application framework layer, an Android runtime and a system library, and a kernel layer. The application layer may include a series of application packages.

As shown in FIG. 2, an application package may include applications such as Camera, Gallery, Calendar, Phone, Maps, Navigation, WLAN, BLUETOOTH, Music, Videos, and Messages.

The application framework layer provides an application programming interface (API) and a programming framework for an application in the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application. The data may include a video, an image, an audio, calls that are made and answered, a browsing history and bookmarks, a phone book, and the like.

The view system includes visual controls such as a control for displaying a text and a control for displaying an image. The view system may be configured to construct an application. A display interface may include one or more views. For example, a display interface including a notification icon of Messages may include a text display view and a picture display view.

The phone manager is configured to provide a communication function for the electronic device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be invoked in JAVA language and a kernel library of Android.

The application layer and the application framework layer run on the virtual machine. The virtual machine executes JAVA files of the application layer and the application framework layer as binary files. The virtual machine is configured to perform functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

It should be understood that the technical solutions in embodiments of this disclosure may be applied to systems such as Android, IOS, and HarmonyOS.

The technical solutions in embodiments of this disclosure may be applied to a memory management scenario of an electronic device.

The electronic device in embodiments of this disclosure may be a television, a desktop computer, or a notebook computer, or may be a portable electronic device, for example, a mobile phone, a tablet computer, a camera, a picture camera, or a video recorder, or may be another electronic device having a storage function, an electronic device in a 5G network, an electronic device in a future evolved public land mobile network (PLMN), or the like. This is not limited in this disclosure.

To provide an intra-process memory isolation mechanism, there are four current memory isolation methods, which are respectively using a memory protection key, a virtual memory protection key, a page table switching technology, and an extended page table switching technology.

The following describes several memory isolation methods in detail with reference to FIG. 3 to FIG. 6.

Figure 3:
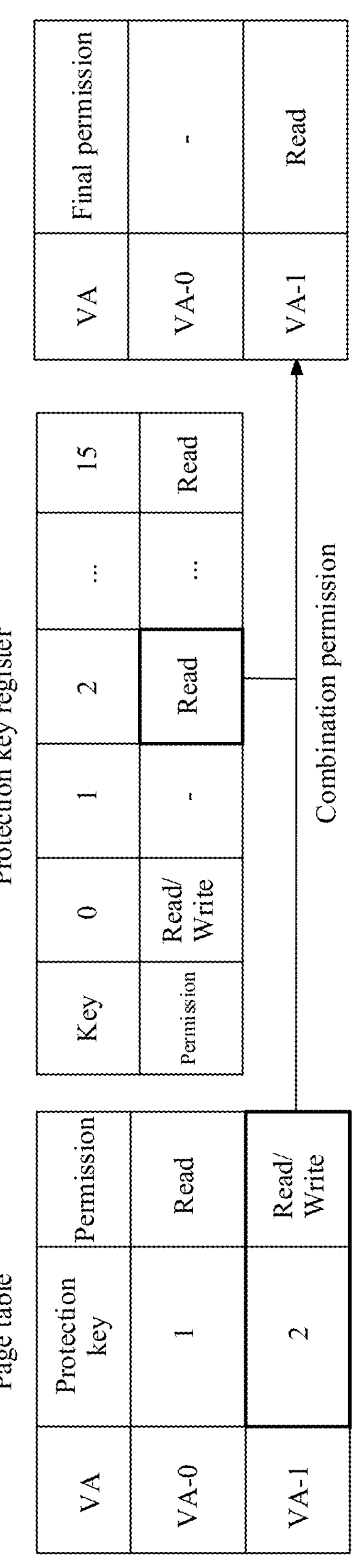
FIG. 3 is a diagram of a working principle of using a memory protection key.

FIG. 3 is a diagram of a working principle of using a memory protection key. The memory protection key is an intra-process memory isolation technology. In this technology, a protection key value is set for a to-be-protected memory isolation domain in an entry corresponding to a page table, and then an isolation domain that can be accessed by a current thread is set in user mode by accessing a protection key register. As shown in FIG. 3, first, the page table records a protection key and access permission for each virtual memory page, and configuration of the page table is generally completed by a kernel. Second, a new protection key register is introduced in the technology, and the protection key register stores access permission corresponding to each protection key. When performing a memory access operation, a processor combines the permission for the page table and the permission (and operation) that is in the protection key register and that corresponds to the virtual page protection key value, to form a final access permission. In addition, a user-mode program may modify permission for each protection key in the protection key register, to achieve an objective of controlling access permission for each memory isolation domain in the user mode.

This method can implement memory isolation, but a maximum quantity of protection keys supported by the memory protection key method is limited. First, a length of a protection key that can be stored in the page table structure is only four bits. In addition, the protection key register has only 32 bits. The two limits the maximum of 16 memory isolation domains supported according to this method. However, some applications need a large quantity of memory isolation domains, and therefore the memory protection key technology cannot be used.

Figure 4:
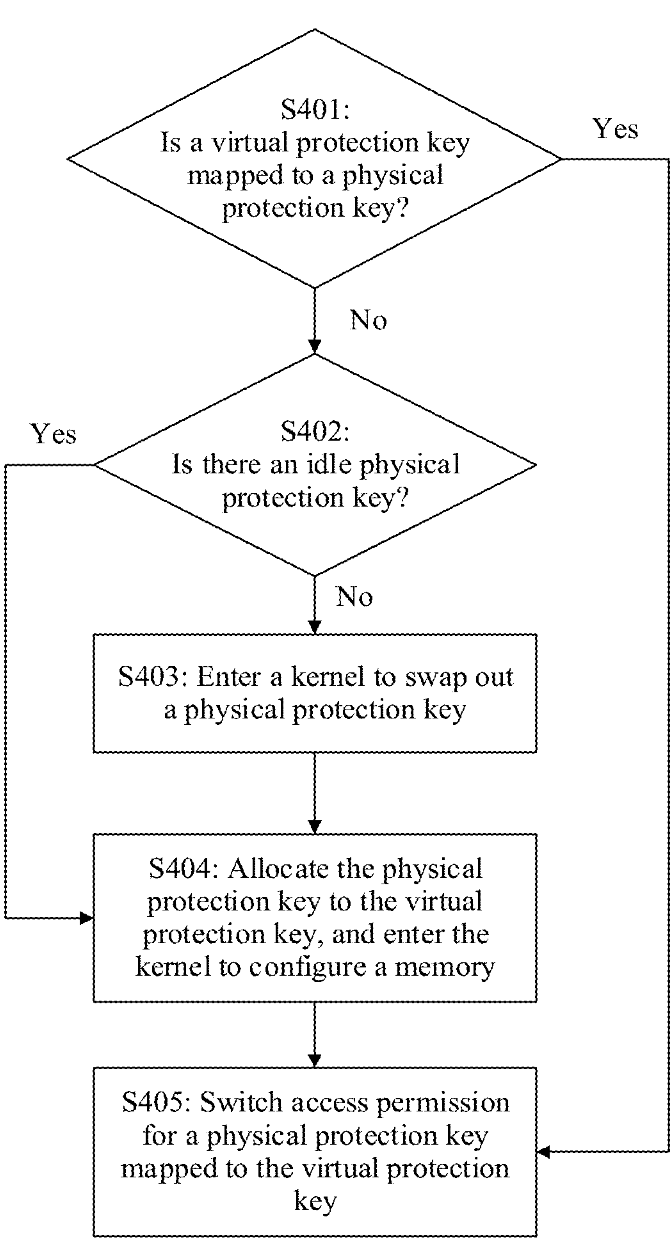
FIG. 4 is a schematic flowchart of a method for using a virtualized memory protection key.

FIG. 4 is a schematic flowchart of a method 400 for using a virtualized memory protection key. The virtual memory protection key method is a memory isolation technology. The technology breaks through a quantity limit of an original memory protection key hardware mechanism. The virtualization mechanism maintains a mapping from a virtual protection key to a physical protection key. When a virtual protection key needs to be used, a physical protection key to which the virtual protection key is mapped is used for permission configuration. As shown in FIG. 4, the method 400 includes the following steps.

Step S401: Query whether a current virtual protection key is mapped to an actual physical protection key. If yes, step S405 is performed; or if no, step S402 is performed.

Step S402: Query whether an idle physical protection key that is not mapped to any virtual protection key exists. If yes, step S404 is performed; or if no, step S403 is performed.

Step S403: Enter a kernel to swap out a physical protection key.

Specifically, the use of the physical protection key by the related memory is removed from the page table, and the mapping from the physical protection key to the virtual protection key is removed.

Step S404: Allocate an actual physical protection key to the virtual protection key, and enter a kernel to configure a page table corresponding to the virtual protection key memory, so that the page table belongs to (is mapped to) the physical protection key.

Step S405: Switch access permission for a physical protection key mapped to the virtual protection key.

Specifically, the access permission for the physical protection key mapped to the virtual protection key is switched by using the access protection key register.

The method can also implement memory isolation, but the method has scalability problems related to the size of the memory isolation domain. First, when the mapping from the virtual protection key to the physical protection key is modified, a protection key of each virtual page in the page table needs to be synchronously updated. In this way, when a memory isolation domain has a large amount of memory, modifying the protection key of each virtual page introduces a large amount of memory access. This affects application performance. Second, when the memory permission is removed, to prevent the page table cache from caching a state of a high access permission, the page table cache needs to be actively invalidated. To invalidate the page table caches of all processor cores, another processor needs to be notified by using an inter-core communication mechanism and wait for all processors to complete the invalidation operation. The two overheads make switching virtual protection keys take a long time when the memory isolation domain is large. In addition, because the page table cache needs to be actively invalidated, an indirect performance loss is caused to application performance after switching is completed.

FIG. 5 is a diagram of a page table switching technology. The page table switching technology may be used to provide a memory isolation domain. A page table is a structure used to translate a virtual address (VA) into a physical address (PA).

As shown in FIG. 5, in this technology, one-page table is allocated to each memory isolation domain, and permission to access a memory of the isolation domain is configured in the page table, but the page table does not include permission to access a memory of another isolation domain. Because page table switching is a privileged instruction, a user-mode program cannot directly switch the page table when accessing the isolation domain memory, but needs to switch a kernel by using a system call.

The page table switching technology has two limitations. First, page table switching needs to enter the kernel, which introduces a large quantity of performance overheads, including the system call and context switching. Second, because a thread can use only one-page table at a same time point, it is difficult to support simultaneous access to multiple memory isolation domains.

Figure 6:
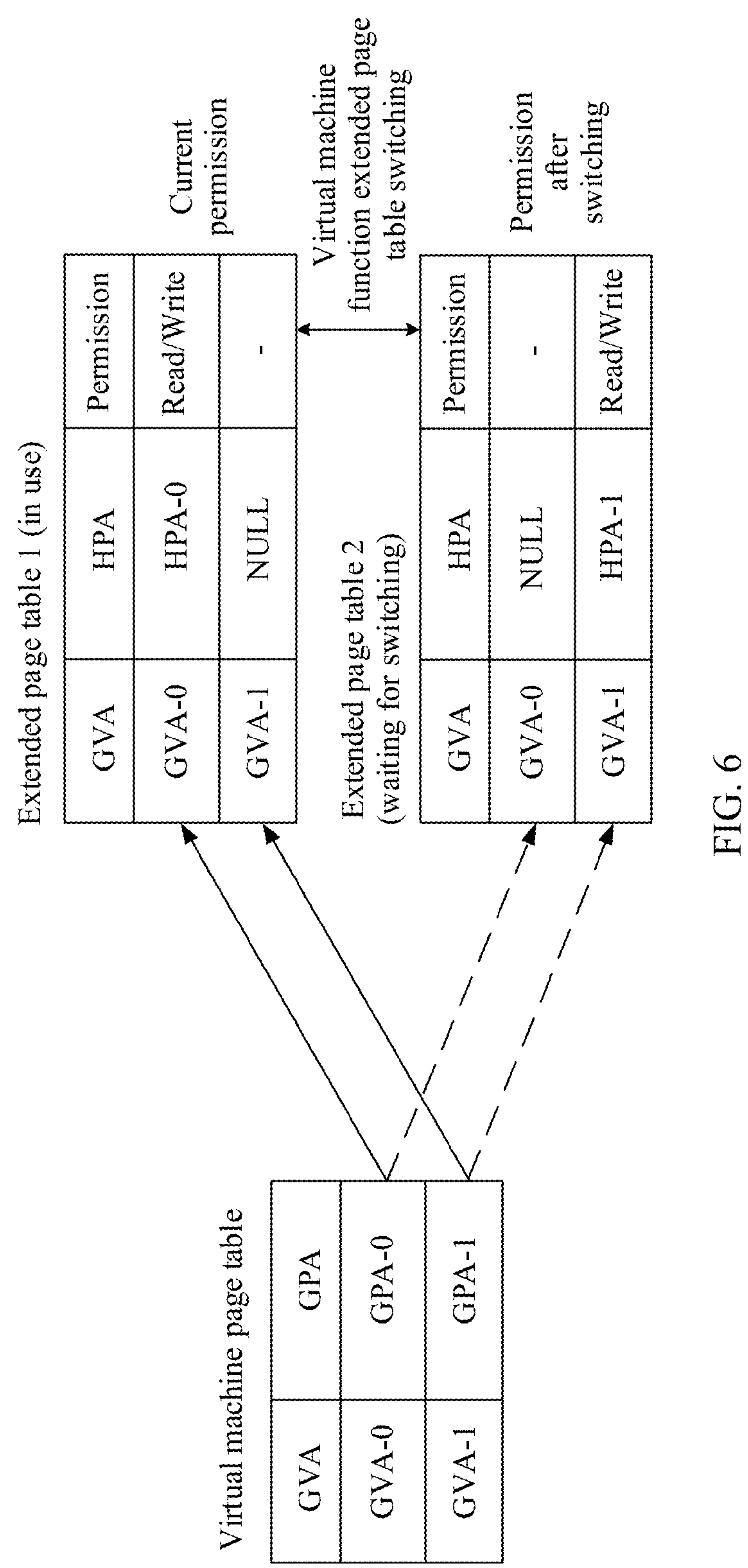
FIG. 6 is a diagram of an extended page table switching technology.

FIG. 6 is a diagram of an extended page table switching technology. The technology may be used to provide a memory isolation domain. In this technology, a virtual machine monitor deploys an operating system on a virtual machine, and translates a guest physical address (GPA) to a host physical address (HPA) by using an extended page table.

As shown in FIG. 6, to construct multiple memory isolation domains, the virtual machine monitor configures one extended page table for each isolation domain, and the extended page table restricts access permission for each memory page based on a memory isolation requirement. In addition, Intel provides a virtual machine function instruction for the virtual machine, to directly switch an extended page table inside the virtual machine. In addition, compared with the solution shown in FIG. 5, in this solution, the user mode can also execute the instruction. This avoids overheads of entering a kernel. When a memory isolation domain needs to be accessed, an application may directly switch to a corresponding extended page table for access through a virtual machine function instruction.

However, the extended page table switching technology is still limited. First, although a virtual machine function used to switch an extended page table can run in a user mode, a delay is still long, and a serious performance problem still occurs when a memory isolation domain is frequently switched. In addition, similar to the page table switching technology, the method is difficult to be used to support simultaneous access to multiple memory isolation domains.

Therefore, the existing memory isolation method has problems of a limited quantity of provided isolation domains, poor scalability of a memory size, high performance overheads, or inability to support simultaneous access to multiple isolation domains.

Based on this, this disclosure provides a method for extending a memory isolation domain and an electronic device. In the method, an extended page table is introduced into a protection key technology, and a kernel is provided with a page table extension and protection key management function. This effectively increases a quantity of available isolation domains. In addition, in the method, a fast switching feature of a memory protection key is used, so that high-performance isolation domain switching can be maintained. In addition, in the method, a virtual machine exception mechanism is used, so that multiple isolation domain memories can be simultaneously accessed.

Terms used in the following embodiments are only intended to describe specific embodiments, but are not intended to limit this disclosure. Terms “one”, “a”, “the”, “the foregoing”, and “this” of singular forms used in this specification and the appended claims of this disclosure are also intended to include expressions such as “one or more”, unless otherwise specified in the context clearly. It should be further understood that in embodiments of this disclosure, “at least one” and “one or more” mean one, two, or more. The term “and/or” is used to describe an association relationship between associated objects and indicates that three relationships may exist. For example, A and/or B may indicate the following cases: Only A exists, both A and B exist, and only B exists, where A and B may be singular or plural. The character “/” generally indicates an “or” relationship between the associated objects.

Reference to “an embodiment”, “some embodiments”, or the like described in this specification indicates that one or more embodiments of this disclosure include a specific feature, structure, or characteristic described with reference to the embodiment. Therefore, statements such as “in an embodiment”, “in some embodiments”, “in another embodiments”, and “in some other embodiments” that appear at different places in this specification do not necessarily mean referring to a same embodiment. Instead, the statements mean “one or more but not all of embodiments”, unless otherwise specifically emphasized in another manner. The terms “include”, “comprise”, and “have”, and their variants all mean “include but are not limited to”, unless otherwise specifically emphasized in another manner.

Figure 7:
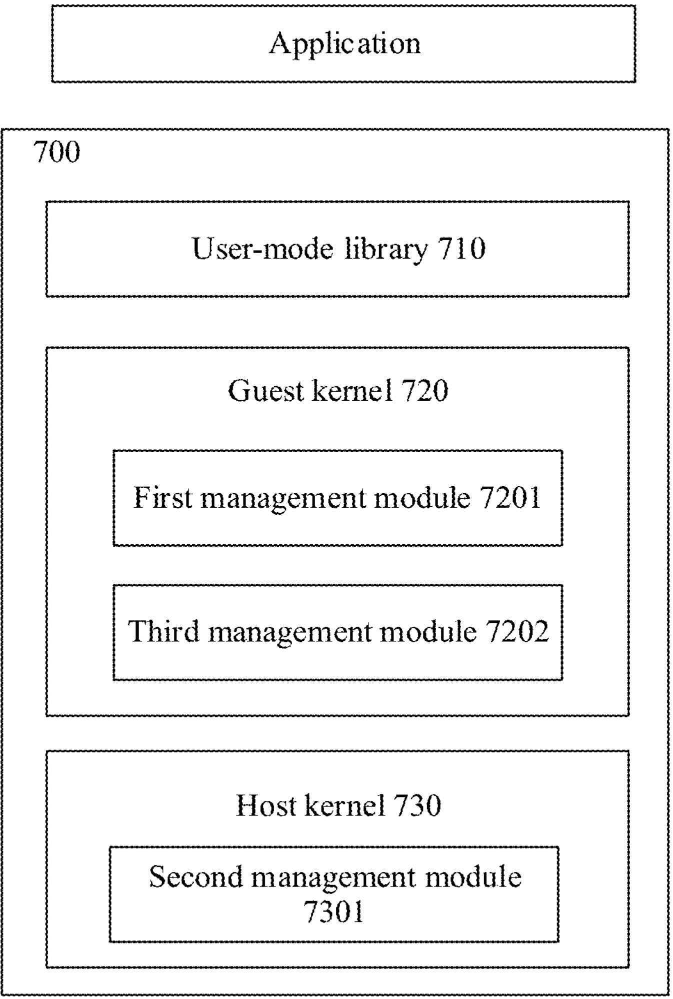
FIG. 7 is a diagram of functional modules of an apparatus for extending a memory isolation domain according to an embodiment.

FIG. 7 is a diagram of functional modules of an apparatus 700 for extending a memory isolation domain according to an embodiment of this disclosure. As shown in FIG. 7, the apparatus 700 includes a user-mode library 710, a guest kernel 720, and a host kernel 730. The guest kernel includes a first management module 7201 and a third management module 7202, and the host kernel includes a second management module 7301. Details are as follows.

The user-mode library 710 is configured to provide an interface for an application, and is further configured to manage a mapping between an isolation domain ID and a protection key, and manage a mapping between an isolation domain ID and an extended page table.

The user-mode library is a user-mode extensible memory isolation domain library.

Specifically, the application uses a memory isolation domain through the interface provided by the user-mode library 710, and the user-mode library 710 is further configured to perform allocation and switching on an extended page table and a protection key.

The guest kernel 720 and the host kernel 730 are configured to maintain the mapping between the isolation domain ID and the protection key and the mapping between the isolation domain ID and the extended page table.

More specifically, the first management module 7201 and the second management module 7301 are configured to maintain the mapping between the isolation domain ID and the protection key and the mapping between the isolation domain ID and the extended page table.

Optionally, the first management module 7201 and the second management module 7301 may be collectively referred to as a memory mapping management module.

The guest kernel 720 is further configured to participate in simultaneous access to multiple isolation domains.

More specifically, the third management module 7202 is configured to participate in simultaneous access to multiple isolation domains.

A participation manner may be as follows: When memory access triggers an extended page table error, the third management module 7202 is configured to process an exception that occurs in an extended page table in a protected memory area.

Optionally, a processing manner is as follows: The third management module 7202 switches the extended page table and updates a memory protection key register, so that the application can normally access the isolation domain.

Optionally, the third management module 7202 may be a multi-isolation-domain access management module, or may be another module having a same or similar function. This is not limited in this disclosure.

Optionally, the first management module 7201 is specifically configured to manage the extended page table management and/or protection key setting.

Optionally, the first management module 7201 may be an extended page table and protection key management module, or may be another memory mapping management module configured to configure an isolated environment. This is not limited in this disclosure.

Optionally, the second management module 7301 is specifically configured to manage the extended page table.

Optionally, the second management module 7301 may be an extended page table management module, or may be another memory mapping management module configured to configure an isolated environment. This is not limited in this disclosure.

Figure 8:
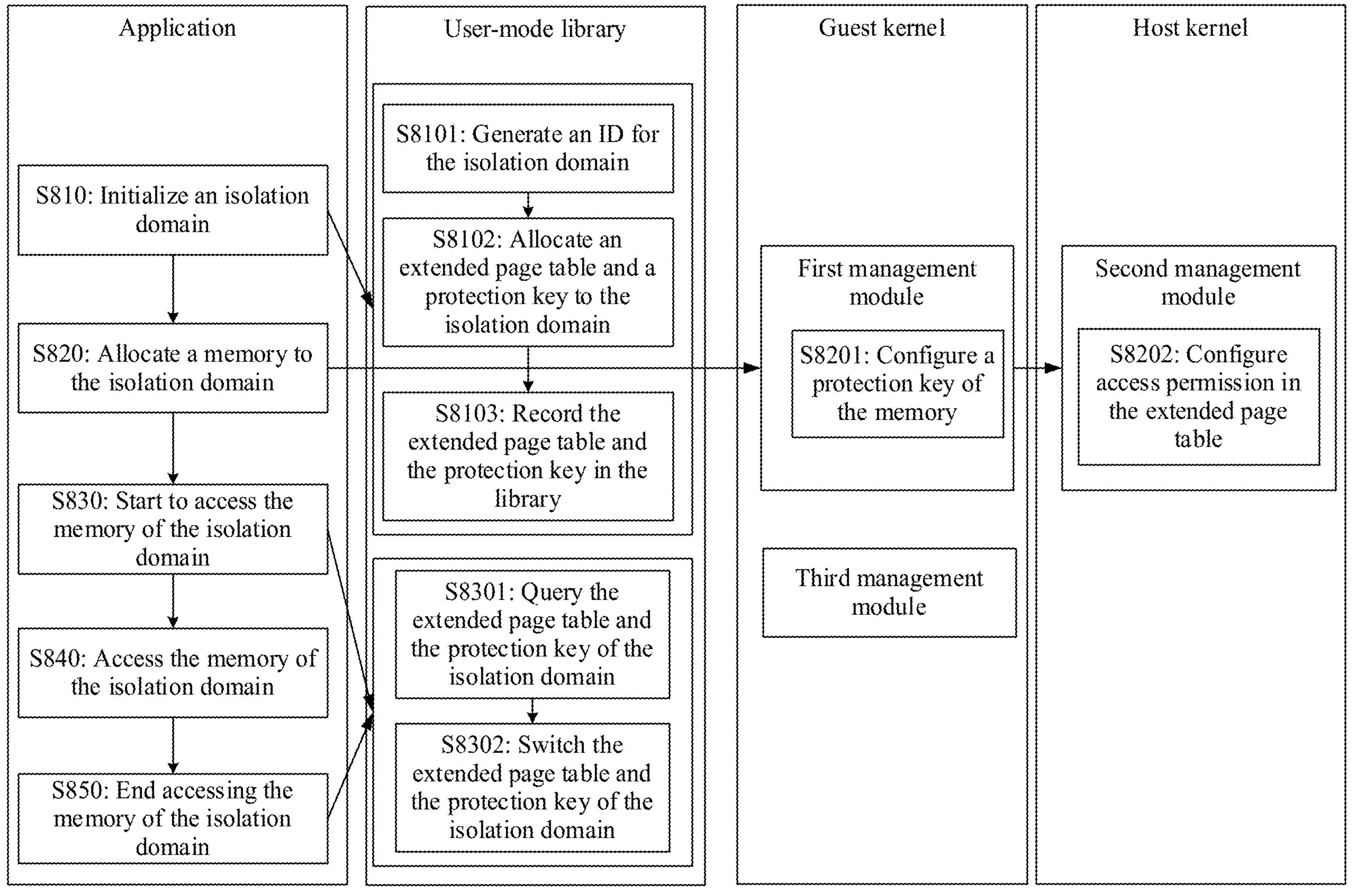
FIG. 8 is a schematic flowchart of a method for extending a memory isolation domain according to an embodiment.

Based on the embodiment shown in FIG. 7, FIG. 8 is a schematic flowchart of a method 800 for extending a memory isolation domain according to an embodiment of this disclosure. As shown in FIG. 8, the method includes the following steps.

Step S810: Initialize an isolation domain.

Optionally, the application uses an alloc_domain interface to initialize a new isolation domain. Specific initialization steps are as follows:

Step S8101: A user-mode library generates an ID for the isolation domain.

Step S8102: The user-mode library allocates a corresponding extended page table and protection key to the isolation domain.

Step S8103: The user-mode library records the allocated extended page table and protection key in the user-mode library.

Optionally, in this step, interfaces provided by the user-mode library for the application are isolation domain allocation and release interfaces. An interface for allocating an isolation domain is specifically int alloc_domains(int num, int ids[ ]), and an interface for releasing an isolation domain is specifically int free_domains(int num, int ids[ ]).

The interface for allocating an isolation domain is used to allocate multiple new isolation domains. When an isolation domain is not required, a memory of the isolation domain is released first, and then the interface for releasing an isolation domain is invoked.

In an existing virtual memory protection key technology, as a size of a protected memory increases, switching performance deteriorates seriously. In this step, before the extended page table and the protection key of the isolation domain are switched, the isolation domain is initialized. This can avoid a scalability problem caused by a large quantity of state changes generated by size expansion of the isolation domain, thereby avoiding a large quantity of caused performance overheads.

It should be understood that step S810 is an optional step.

Step S820: Allocate a memory to the isolation domain.

Optionally, the application uses the alloc_mmap interface to configure the memory for the isolation domain with the specified ID. Specific steps are as follows:

Step S8201: The user-mode library enters a guest kernel by using a system call, and a first management module in the guest kernel configures a protection key corresponding to the memory for the isolation domain.

Optionally, the first management module 7201 may be an extended page table and protection key management module, or may be another memory mapping management module configured to configure an isolated environment. This is not limited in this disclosure.

Step S8202: A second management module in a host kernel configures, in the extended page table, access permission corresponding to the isolation domain.

Optionally, in this step, interfaces provided by the user-mode library for the application are isolation domain memory allocation and release interfaces. An interface for allocating an isolation domain memory is specifically void *domain_mmap(int id, void *addr, size_t len, int prot, int flags), and an interface for releasing an isolation domain memory is specifically int domain_munmap(void *addr, size_t len).

Step S830: Start to access the memory of the isolation domain.

Before starting to access the memory of the isolation domain, the method further includes the following steps:

Step S8301: An application invokes a domain_begin function of the user-mode library, and queries the extended page table and the protection key of the isolation domain by using the function.

Step S8302: Switch the extended page table and the protection key of the isolation domain.

Step S840: Access the memory of the isolation domain.

After step S8301 and step S8302 are performed, the application may access the memory in the isolation domain.

Step S850: End accessing the memory of the isolation domain.

After the access is completed, the application uses the domain_end function to reclaim the access permission for the isolation domain.

Optionally, interfaces provided by the user-mode library for the application in step S830 and step S850 are interfaces for accessing the isolation domain memory. An interface for starting to access an isolation domain is specifically int domain_begin (int id, int prot), and an interface for ending accessing an isolation domain is specifically int domain_end (int id).

In this embodiment of this disclosure, the user-mode library provides the interface for the application to use the memory isolation domain. The guest kernel and the host kernel jointly maintain a mapping relationship between an isolation domain ID and a protection key and a mapping relationship between an isolation domain ID and an extended page table, and memory management modules of the guest kernel and the host kernel are extended to some extent, so that the memory management modules support protection key setting in the extended page table and management of multiple extended page tables. In this solution of this disclosure, allocation of the extended page table and allocation of the protection key are combined, so that a quantity of available isolation domains can be effectively increased. In addition, in an existing virtual memory protection key technology, as a size of a protected memory increases, switching performance deteriorates seriously. In the solution of this disclosure, before the extended page table and the protection key of the isolation domain are switched, the isolation domain is initialized. This can avoid a scalability problem caused by a large quantity of state changes generated by size expansion of the isolation domain, thereby avoiding a large quantity of caused performance overheads.

Figure 9:
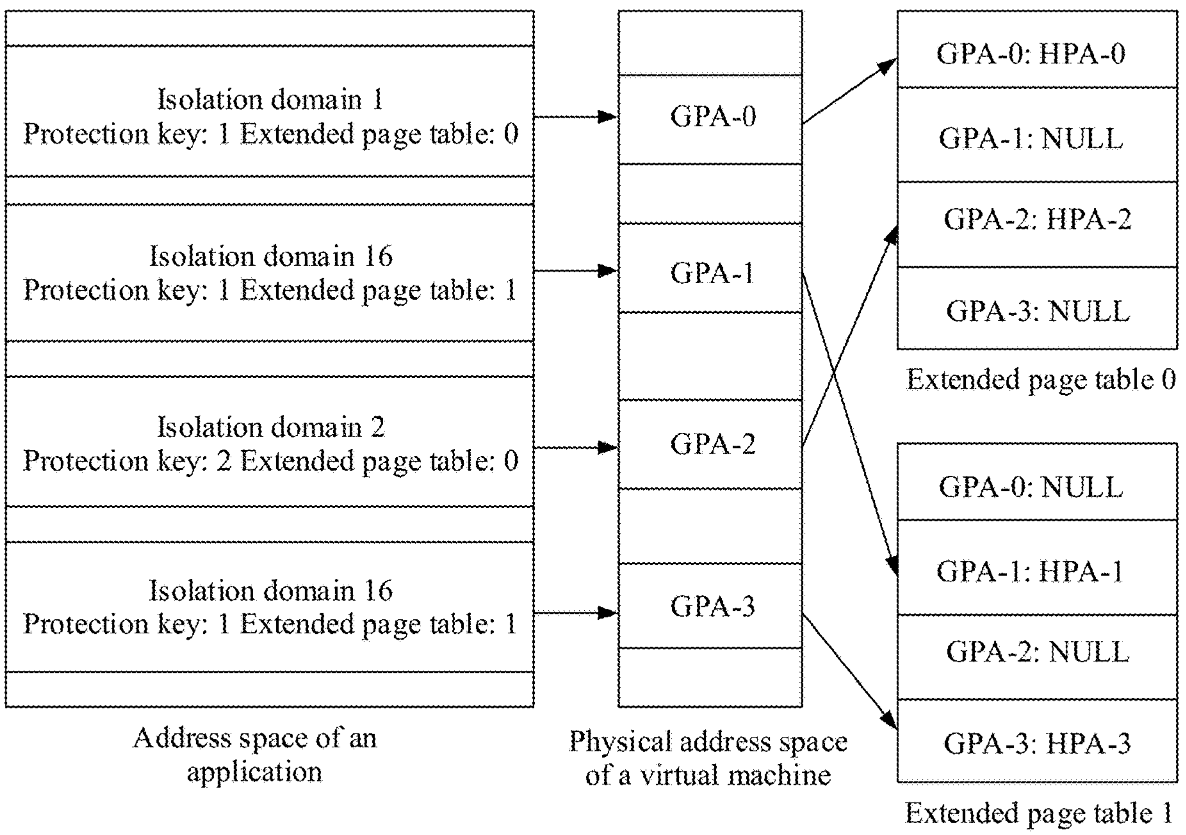
FIG. 9 is a diagram of a mapping relationship of a memory isolation mechanism maintained by a guest kernel and a host kernel according to an embodiment.

Based on the embodiment shown in FIG. 7 or FIG. 8, FIG. 9 is a diagram of a mapping relationship of a memory isolation mechanism maintained by a guest kernel and a host kernel according to an embodiment of this disclosure. The following specifically describes, with reference to FIG. 9, a quantity of available isolation domains, switching on multiple isolation domains, and simultaneous access of multiple isolation domains that are supported in the solutions of this disclosure.

In this embodiment of this disclosure, the application may obtain multiple isolation domains through division in virtual address space of the application, and each isolation domain is assigned an independent ID. Each isolation domain ID is mapped to a protection key and an extended page table. Each extended page table can contain multiple isolation domains. These isolation domains have different protection keys but use the same extended page table.

Because the isolation domain is in a correspondence with the ID of the isolation domain, the mapping from the ID of the isolation domain to the protection key and the extended page table may be understood as a mapping from the isolation domain to the protection key and the extended page table.

As shown in FIG. 9, an application divides an isolation domain 1, an isolation domain 2, and isolation domains 16 in virtual address space of the application. The isolation domain 1 uses a protection key 1 and an extended page table 0, the isolation domain 2 uses a protection key 2 and an extended page table 0, and the isolation domains 16 each use a protection key 1 and an extended page table 1.

It can be seen from FIG. 9 that both the isolation domain 1 and the isolation domain 2 use the extended page table 0, but use different protection key 1 and protection key 2. Isolation domains that use different extended page tables may reuse the same protection key. For example, both the isolation domain 1 and the isolation domain 16 use the protection key 1, but use different extended page table 0 and extended page table 1. When a specific physical protection key is used in the isolation domain, the physical protection key is marked in a related page table entry in the virtual machine page table. When a specific extended page table is used in the isolation domain, the extended page table is mapped to a memory of the isolation domain, and all extended page tables are also mapped to a memory that does not belong to any isolation domain.

Quantity of Available Isolation Domains

Because a protection key hardware mechanism supports a maximum of 16 protection keys, a maximum of 15 isolation domains that use the same extended page table are supported, where the protection key 0 (GPA-0) is used to identify an unprotected memory (that is, a memory that does not belong to any isolation domain).

However, a maximum of 512 extended page tables can be supported by a hardware mechanism for switching a virtual machine function extended page table. The method for extending a memory isolation domain provided in this embodiment of this disclosure can support 7680 (512×15) isolation domains.

Switching Between Multiple Isolation Domains

When multiple isolation domains are switched, performance affinity occurs.

Because a permission switching delay of the protection key is lower than a switching delay of the extended page table, performance is better when isolation domains that belong to the same extended page table are switched. For example, in the embodiment shown in FIG. 9, both the isolation domain 1 and the isolation domain 2 belong to an extended page table 0, and the isolation domain 1 and the isolation domain 16 belong to different extended page tables. Therefore, switching performance of the isolation domain 1 and the isolation domain 2 is better than switching performance of the isolation domain 1 and the isolation domain 16. The application can use this feature to optimize the isolation domain switching performance. For details, refer to Example 2 in the following.

Simultaneous Access to Multiple Isolation Domains

The guest kernel also provides support for simultaneous access to multiple isolation domains. A specific execution module may be a third management module in the guest kernel.

Optionally, the third management module 7202 may be a multi-isolation-domain access management module, or may be another module having a same or similar function. This is not limited in this disclosure.

For a case in which isolation domains having same extended page tables are accessed, only the protection key register needs to be set to allow multiple protection keys. However, when isolation domains (the isolation domain 1 and the isolation domain 16 shown in FIG. 9) having different extended page tables are accessed, a GPA of a memory isolated in an extended page table is not mapped in another extended page table. Therefore, when the latter extended page table is used, an extended page table error is triggered during memory access.

In a common virtual machine, this error is handled by the host machine. However, in this disclosure, a virtual machine exception hardware mechanism is used. An exception of an extended page table that occurs in a protected memory area is directly processed by a virtual machine kernel (that is, the guest kernel), and the virtual machine kernel switches the extended page table and updates a memory protection key register. Then, the application can normally access the isolation domain. In addition, to enable the guest kernel to know which isolation domains are allowed to be accessed, when the guest kernel simultaneously accesses isolation domains that use different extended page tables, the user-mode library notifies the guest kernel of the extended page tables that are currently allowed to be accessed and the corresponding protection keys.

In this embodiment of this disclosure, a memory protection key technology and an extended page table switching technology are combined, so that a protection key that cannot be accommodated due to a physical limitation of a protection key register is isolated by using an extended page table. Because a quantity of available extended page tables is large, the solution of this disclosure effectively increases a quantity of available isolation domains (a maximum of 7680 isolation domains).

In addition, in the solution of this disclosure, an affinity design is introduced, and a feature of a low switching delay of multiple isolation domains that use a same extended page table is used, so that only a protection key register needs to be modified in most memory isolation domains during permission switching, and only few high-delay extended page table switching is introduced. Therefore, in the solution of this disclosure, performance overheads can be reduced.

In addition, in the solution of this disclosure, a virtualization exception mechanism is used to track access to a cross-extended page table isolation domain, and a virtual machine exception is processed by using a guest kernel, so that multiple cross-extended page table isolation domains can be simultaneously accessed. Therefore, the solution of this disclosure can meet a requirement that some applications simultaneously access multiple memory isolation domains. In addition, in the solution of this disclosure, an extended page table is transparently switched in a guest kernel, to grant access permission to an isolation domain.

To better understand a process in which the user-mode library provides the interface for the application in this embodiment of this disclosure, the following describes in detail, for example, the interface provided by the user-mode library for the application.

The user-mode library is used to maintain the allocation and switching on the extended page table and protection key corresponding to the isolation domain, and provide interfaces for applications. Based on functions, user-mode interfaces provided for applications can be classified into the following types:

1. Isolation Domain Allocation and Release Interfaces

An interface for allocating an isolation domain is int alloc_domains(int num, int ids[ ]), and an interface for releasing an isolation domain is int free_domains(int num, int ids[ ]).

The interface for allocating the isolation domain is used to allocate multiple new isolation domains, and isolation domains generated by invoking a same allocation interface are preferentially allocated to a same extended page table, to meet the foregoing affinity requirement.

The user-mode library establishes the mapping from the isolation domain ID to the extended page table and the protection key, and maintains whether all isolation domain IDs have been allocated. When an isolation domain is no longer required, the memory of the isolation domain is first released, and then the interface for releasing an isolation domain is invoked.

2. Isolation Domain Memory Allocation and Release Interfaces

An interface for allocating an isolation domain memory is void *domain_mmap(int id, void *addr, size_t len, int prot, int flags), and an interface for releasing an isolation domain memory is int domain_munmap(void *addr, size_t len).

The interface for allocating the isolation domain memory allocates a specified memory area to a specified isolation domain. The user-mode library forwards the request to the guest kernel to set a protection key of the specified memory in the extended page table, and sends the request to the host machine to set a mapping of the extended page table, to construct the mapping structure shown in FIG. 9. When an isolation domain does not need a specific memory, use the interface for releasing an isolation domain memory to remove protection of the specified memory area.

3. Interfaces for Accessing an Isolation Domain Memory

An interface for starting to access an isolation domain is int domain_begin (int id, int prot), and an interface for ending accessing an isolation domain is int domain_end (int id).

Before accessing the isolation domain memory, the application invokes the interface for starting to access the isolation domain. The user-mode library queries the protection key and extended page table corresponding to the isolation domain ID, switches the corresponding extended page table when switching is required, and then sets access permission in the protection key register based on permission and a protection key value provided by the interface. After the access to the memory of the isolation domain ends, the application invokes the interface for ending accessing to the isolation domain to reset the protection key register to cancel the access permission.

For example, based on the embodiment shown in FIG. 8, with reference to FIG. 10 to FIG. 18, the following describes in detail a method for extending a memory isolation domain provided in an embodiment of this disclosure.

Figure 10:
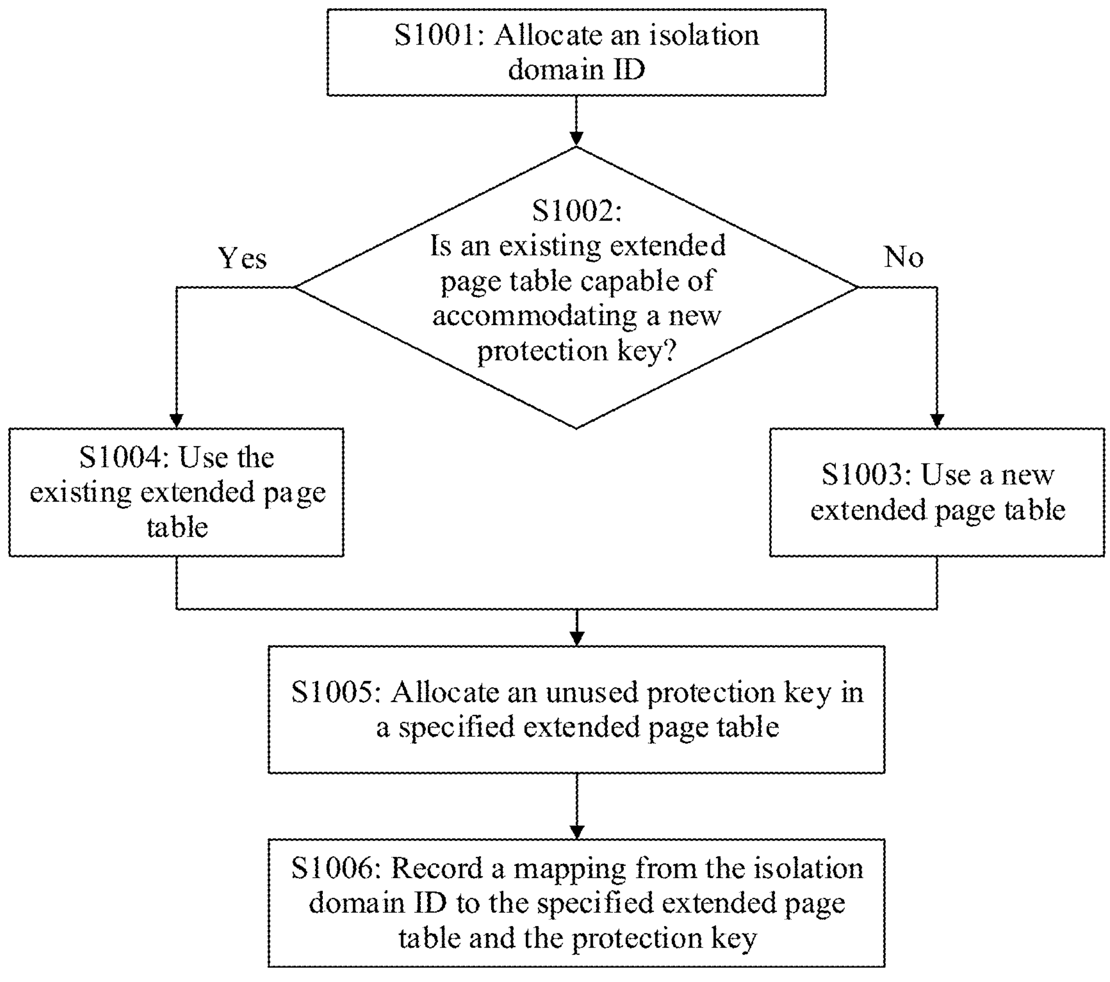
FIG. 10 is a schematic flowchart of a method for allocating an isolation domain according to an embodiment.

FIG. 10 is a schematic flowchart of a method 1000 for allocating an isolation domain according to an embodiment of this disclosure. As shown in FIG. 10, the method 1000 includes the following steps.

Step S1001: A user-mode library allocates an isolation domain ID.

Different isolation domains have different IDs. To accurately identify a corresponding isolation domain, the user-mode library allocates an isolation domain ID to a new isolation domain.

Step S1002: The user-mode library queries whether an existing extended page table is capable of accommodating a new protection key. If the existing extended page table is capable of accommodating a new protection key, step S1004 is performed; or if the existing extended page table is incapable of accommodating a new protection key, step S1003 is performed.

Each extended page table is capable of accommodating 16 protection keys (one is a protection key corresponding to an unprotected memory).

Step S1003: Use a new extended page table. That is, the new extended page table is allocated to the current isolation domain ID.

Step S1004: Use the existing extended page table. That is, a used extended page table is allocated to the current isolation domain ID.

Step S1005: Query an available protection key in a specified extended page table, and allocate one protection key to the current isolation domain ID.

The specified extended page table is an extended page table determined to be used in step S1003 or step S1004.

Step S1006: Record, in the user-mode library, an extended page table (specified extended page table) and the protection key that belong to the current isolation domain ID. That is, a mapping from the current isolation domain ID to the specified extended page table and the protection key is recorded in the user-mode library.

Figure 11:
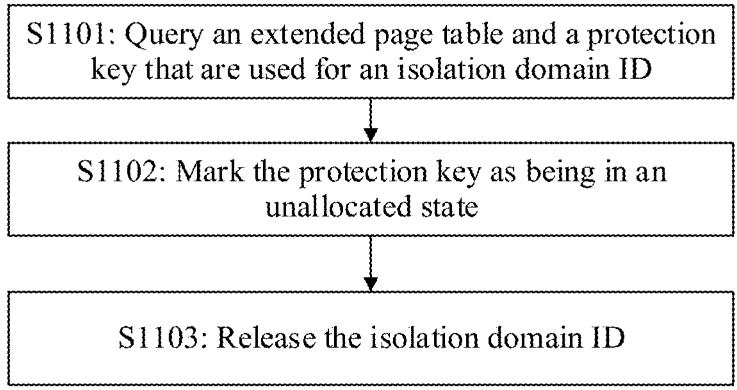
FIG. 11 is a schematic flowchart of a method for releasing an isolation domain according to an embodiment.

Corresponding to the embodiment shown in FIG. 10, FIG. 11 is a schematic flowchart of a method 1100 for releasing an isolation domain according to an embodiment of this disclosure. As shown in FIG. 11, the method 1100 includes the following steps.

Step S1101: A user-mode library queries an extended page table and a protection key that are used for a to-be-released isolation domain ID.

Step S1102: Mark the protection key as being in an unallocated state in the extended page table.

After the protection key is marked, in the extended page table, as being in the unallocated state, when the user-mode library allocates a new isolation domain, the protection key in the unallocated state may be reused.

Step S1103: Release the isolation domain ID.

After the isolation domain ID is released, the user-mode library can reuse the ID when allocating a new isolation domain.

In this embodiment of this disclosure, a memory protection key technology and an extended page table switching technology are combined, so that a protection key that cannot be accommodated due to a physical limitation of a protection key register is isolated by using an extended page table. Because a quantity of available extended page tables is large, the solution of this disclosure can effectively increase a quantity of available isolation domains (a maximum of 7680 isolation domains).

In addition, in the solution of this disclosure, before the extended page table and the protection key of the isolation domain are switched, the isolation domain is initialized. This can avoid a scalability problem caused by a large quantity of state changes generated by size expansion of the isolation domain, thereby avoiding a large quantity of caused performance overheads.

Figure 12:
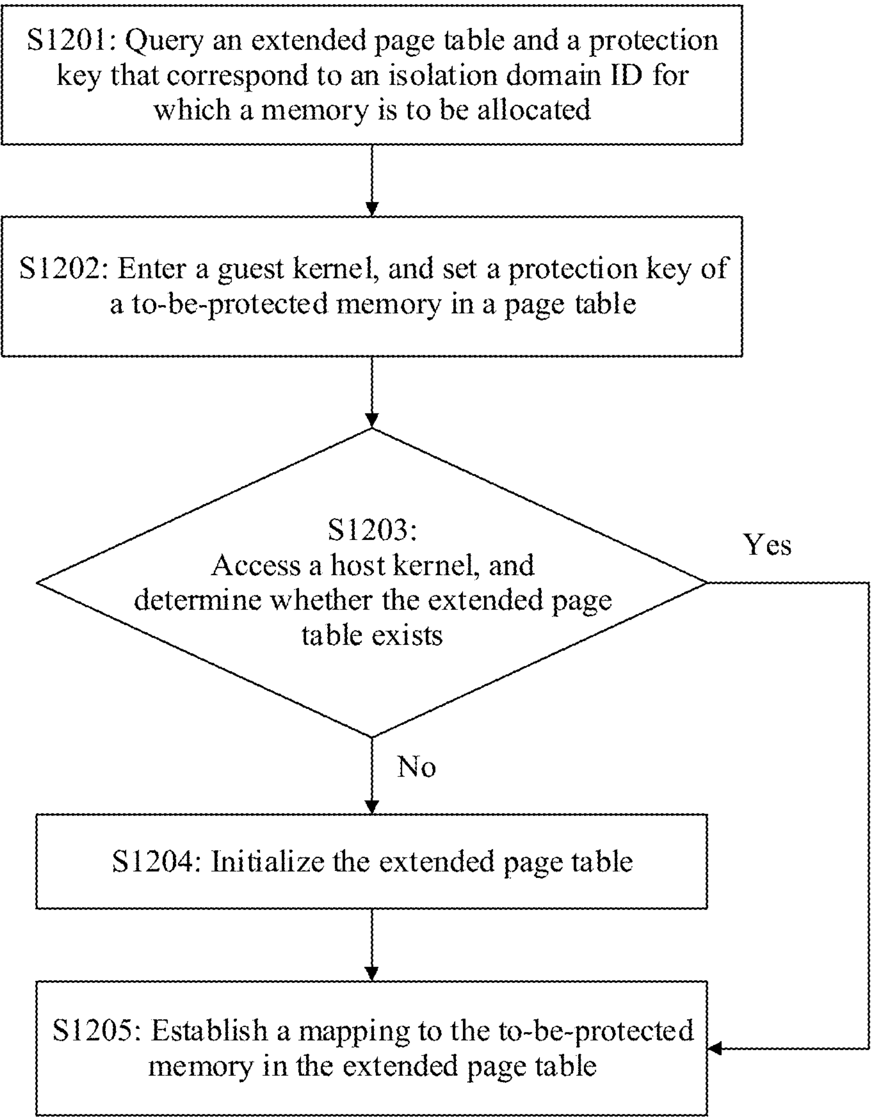
FIG. 12 is a schematic flowchart of a method for allocating an isolation domain memory according to an embodiment.

FIG. 12 is a schematic flowchart of a method 1200 for allocating an isolation domain memory according to an embodiment of this disclosure. As shown in FIG. 12, the method 1200 includes the following steps.

Step S1201: Query an extended page table and a protection key that are used for an isolation domain ID for which a memory is to be allocated.

Because an isolation domain is in a correspondence with an ID of the isolation domain, the mapping from the ID of the isolation domain to the protection key and the extended page table may be understood as a mapping from the isolation domain to the protection key and the extended page table. In other words, the extended page table and the protection key that are used for the isolation domain ID for which the memory is to be allocated may also be described as the extended page table and the protection key that correspond to the isolation domain in which the memory is to be allocated.

Step S1202: Enter a guest kernel, and set a protection key of a to-be-protected memory in a page table.

The page table is a page table in the guest kernel.

Step S1203: Enter a host kernel, and query whether an extended page table that needs to be used (the extended page table that is used for the isolation domain ID and that is queried in step S1201) already exists. If yes, step S1205 is performed; or if no, step S1204 is performed.

Step S1204: The host kernel initializes the extended page table.

In this step, when the extended page table is initialized, a mapping to all unprotected memories is included, and all the extended page tables maintain the same mapping to the unprotected memories. Different extended page tables use a same page table page as much as possible, to reduce memory consumption of multiple extended page tables and avoid synchronization overheads.

Step S1205: The host machine establishes a mapping to the to-be-protected memory in the extended page table.

For a protected memory that does not belong to the extended page table, the extended page table maps the memories to a null address, and any access triggers an error.

Figure 13:
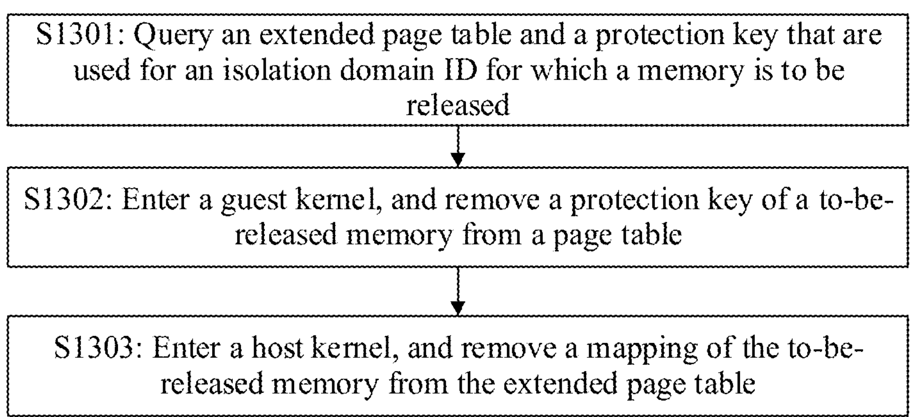
FIG. 13 is a schematic flowchart of a method for releasing an isolation domain memory according to an embodiment.

Corresponding to the embodiment shown in FIG. 12, FIG. 13 is a schematic flowchart of a method 1300 for releasing an isolation domain memory according to an embodiment of this disclosure. As shown in FIG. 13, the method 1300 includes the following steps.

Step S1301: Query an extended page table and a protection key that are used for an isolation domain ID for which a memory is to be released.

Step S1302: Enter a guest kernel, and remove a protection key of a to-be-released (destroyed) memory from a page table.

Step S1303: Enter a host kernel, and remove a mapping of the to-be-released memory from the extended page table.

Optionally, a manner of removing the mapping of the to-be-destroyed memory from the extended page table is: modifying the mapping relationship to be mapped to a null address.

In this solution, even if all memory protection keys in the extended page table are not allocated to any isolation domain, the extended page table is not destroyed, so that overheads of destroying the extended page table and subsequently reinitializing the extended page table can be avoided.

In this embodiment of this disclosure, the guest kernel and the host kernel jointly maintain the mapping relationship between the isolation domain ID, the protection key, and the extended page table, and extend the memory management modules of the guest kernel and the host kernel to some extent, so that the memory management modules support protection key setting in the extended page table and management of multiple extended page tables.

Figure 14:
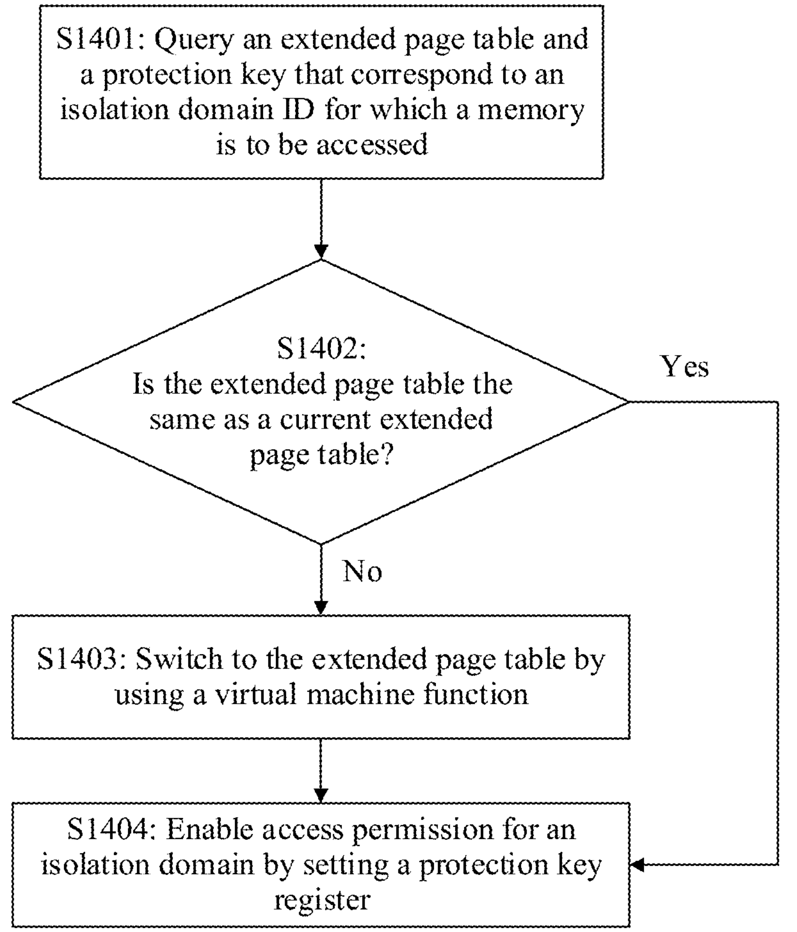
FIG. 14 is a schematic flowchart of a method for allowing access to an isolation domain memory according to an embodiment.

FIG. 14 is a schematic flowchart of a method 1400 for allowing access to an isolation domain memory according to an embodiment of this disclosure. As shown in FIG. 14, the method 1400 includes the following steps.

Step S1401: Query an extended page table and a protection key that are used for an isolation domain ID for which a memory is to be accessed.

The extended page table and the protection key that are used for the isolation domain ID for which a memory is to be allocated and accessed may also be described as an extended page table and a protection key that are allocated to the isolation domain ID for which a memory is to be allocated and accessed.

Step S1402: Determine whether an extended page table being currently used is the same as an extended page table (the extended page table used for the isolation domain ID in step S1401) to be used for the isolation domain ID. If yes, step S1404 is performed; or if no, step S1403 is performed.

The extended page table being currently used may be referred to as a current extended page table for short, and the current extended page table is an extended page table that has been allocated currently.

Step S1403: Switch, by using a virtual machine function, to an extended page table to be used for the isolation domain ID.

Step S1404: Enable access permission for an isolation domain by setting a protection key register.

Optionally, access to the isolation domain is enabled in a manner of writing read/write permission to the protection key register.

Figures 15, 16:
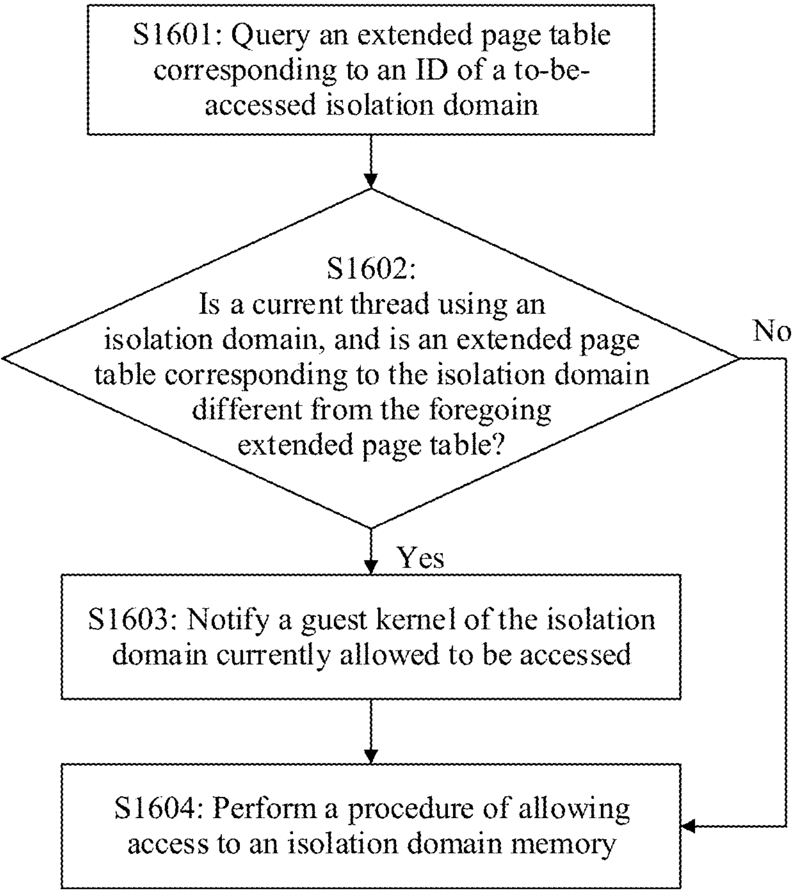
FIG. 15 is a schematic flowchart of a method for forbidding access to an isolation domain memory according to an embodiment.
FIG. 16 is a schematic flowchart of a method for allowing access to an isolation domain memory when access to multiple isolation domains is supported according to an embodiment.

In parallel with the embodiment shown in FIG. 14, FIG. 15 is a schematic flowchart of a method 1500 for forbidding access to an isolation domain memory according to an embodiment of this disclosure. As shown in FIG. 15, the method 1500 includes the following steps.

Step S1501: Query a protection key used for an isolation domain ID for which a memory is forbidden to be accessed.

Step S1502: Cancel access permission for an isolation domain by setting a protection key register.

Optionally, permission to access the isolation domain memory is canceled in a manner of writing the read/write permission to the protection key register.

The extended page table may not be switched, because all extended page tables allow access to the unprotected memory.

In this embodiment of this disclosure, a feature of fast switching on a protection key can be used to maintain high-performance isolation domain switching. In addition, in the solution in this embodiment of this disclosure, only a few instructions (for example, an access allowed or access forbidden instruction) are run in the user mode as far as possible on the critical path of the isolation domain switching, to reduce performance overheads.

FIG. 16 is a schematic flowchart of a method 1600 for allowing access to an isolation domain memory when access to multiple isolation domains is supported according to an embodiment of this disclosure. As shown in FIG. 16, the method 1600 includes the following steps.

Step S1601: Query an extended page table used for an ID of a to-be-accessed isolation domain.

Step S1602: Determine whether a current thread is using an isolation domain, and an extended page table corresponding to the isolation domain is different from the foregoing extended page table (in other words, determine whether another isolation domain that is allowed to be accessed currently exists, and an extended page table used for the isolation domain is different from the extended page table queried in step S1601). If yes, step S1603 is performed; or if no, step S1604 is performed.

Step S1603: A user-mode library notifies a guest kernel of the isolation domain currently allowed to be accessed.

It should be noted that the user-mode library notifies the guest kernel of the isolation domain currently allowed to be accessed, to provide information for a virtual machine exception that may occur in a subsequent access process of the isolation domain, so that the guest kernel switches the isolation domain.

Step S1604: Perform a procedure of allowing access to an isolation domain memory provided in the embodiment shown in FIG. 14.

Figure 17:
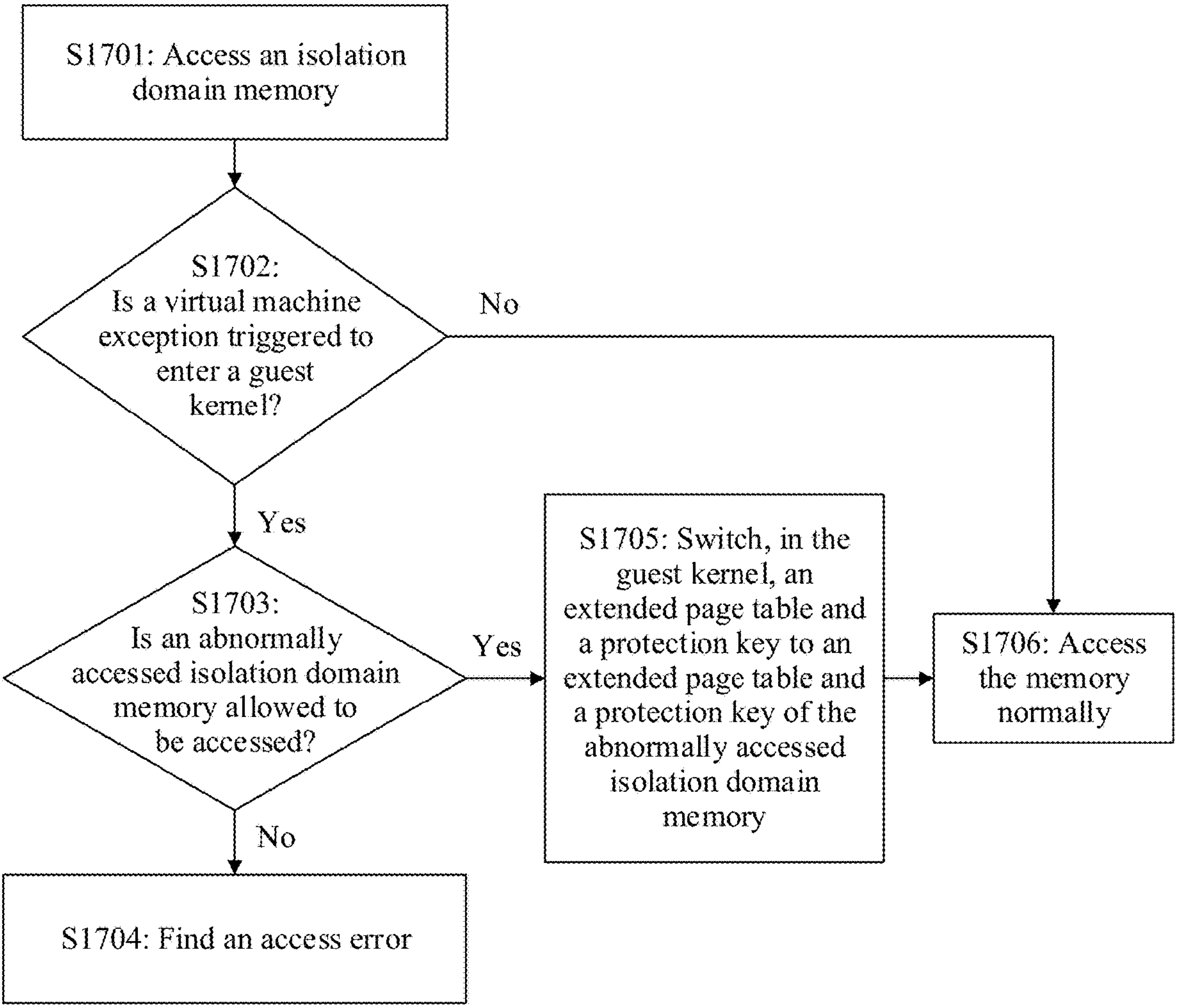
FIG. 17 is a schematic flowchart of a method for accessing an isolation domain memory when access to multiple isolation domains is supported according to an embodiment.

In parallel with the embodiment shown in FIG. 16, FIG. 17 is a schematic flowchart of a method 1700 for accessing an isolation domain memory when access to multiple isolation domains is supported according to an embodiment of this disclosure. As shown in FIG. 17, the method 1700 includes the following steps.

Step S1701: A processor accesses an isolation domain memory.

Step S1702: Determine whether a virtual machine exception is triggered to enter a guest kernel. If yes, step S1703 is performed; or if no, step S1706 is performed.

Step S1703: Determine whether an abnormally accessed address is allowed to be accessed. If yes, step S1705 is performed; or if no, step S1704 is performed.

Optionally, this step may also be described as follows: determining, in a processing function for a virtual machine exception, whether an address in which an error occurs belongs to the isolation domain that is currently allowed to be accessed by the guest kernel and notified by the user-mode library in step S1603 in the embodiment shown in FIG. 16. If yes, step S1705 is performed; or if no, step S1704 is performed.

Optionally, the step may be further described as follows: determining whether an abnormally accessed isolation domain memory is allowed to be accessed. If yes, step S1705 is performed; or if no, step S1704 is performed.

The user mode notifies the guest kernel of whether the abnormally accessed isolation domain memory is allowed to be accessed, and the guest kernel may generate and maintain an accessible isolation domain list based on the received accessible isolation domain information.

Step S1704: Find a memory access error, and trigger exception processing.

Step S1705: Switch to an isolation domain to which an address with an error belongs in a virtual machine exception processing function, and switch an extended page table and a protection key. Finally, return to the user-mode library to continue the execution. Optionally, this step may be further described as follows: Switch, in the guest kernel, an extended page table and a protection key to an extended page table and a protection key of the abnormally accessed isolation domain memory.

Step S1706: Access the memory of the isolation domain normally.

Figure 18:
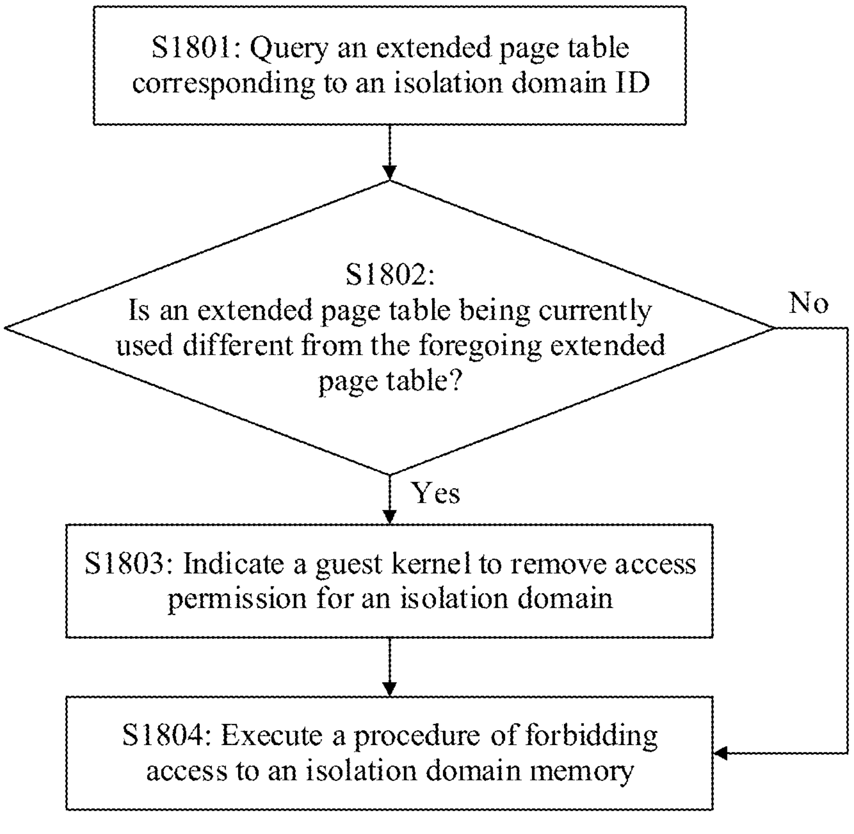
FIG. 18 is a schematic flowchart of a method for forbidding access to an isolation domain memory when access to multiple isolation domains is supported according to an embodiment.

In parallel with the embodiments shown in FIG. 16 and FIG. 17, FIG. 18 is a schematic flowchart of a method 1800 for forbidding access to an isolation domain memory when access to multiple isolation domains is supported according to an embodiment of this disclosure. As shown in FIG. 18, the method 1800 includes the following steps:

Step S1801: Query an extended page table used for an isolation domain ID for which a memory is to be forbidden to be accessed.

Step S1802: Determine whether a state of a determining condition is met: another isolation domain that is allowed to be accessed currently exists, and an extended page table used for the isolation domain is different from an extended page table of the isolation domain to be forbidden to be accessed. If yes, step S1803 is performed; or if no, step S1804 is performed.

S1803: Indicate a guest kernel to remove access permission for the isolation domain.

Then, if an access exception occurs in the isolation domain, step S1704 in the embodiment shown in FIG. 17 is performed.

Step S1804: Perform a procedure of forbidding access to the isolation domain memory provided in the embodiment shown in FIG. 15.

In embodiments of this disclosure, a virtual machine exception mechanism is fully used to support simultaneous access to multiple isolation domain memories. After memory access across an extended page table isolation domain occurs, the triggered exception can be processed in the guest kernel. The isolation domain is switched in a slow path, so that the application can simultaneously access and use isolation domains of multiple extended page tables.

To more clearly reflect an application scenario and technical effect of the solutions of this disclosure, the following describes specific application of the solutions of this disclosure with reference to three specific examples.

Note: In the following three specific examples, related tests are performed on the Intel Gold 6138 processor with 20 cores and a frequency of 2 GHz. The memory is 80 GB. Both the virtual machine and host machine use the Linux kernel of the 4.19.88 version. In addition, in the test, the solution of this disclosure is compared with the four technologies shown in FIG. 3 to FIG. 6. The four technologies (a memory protection key, a virtualized memory protection key, page table switching, and extended page table switching) are respectively marked as MPK, libmpk, lwC, and VMFUNC. Native indicates that no memory isolation protection is performed, and EMPK indicates an extensible memory isolation domain provided in embodiments of this disclosure.

Example 1

Figure 19:
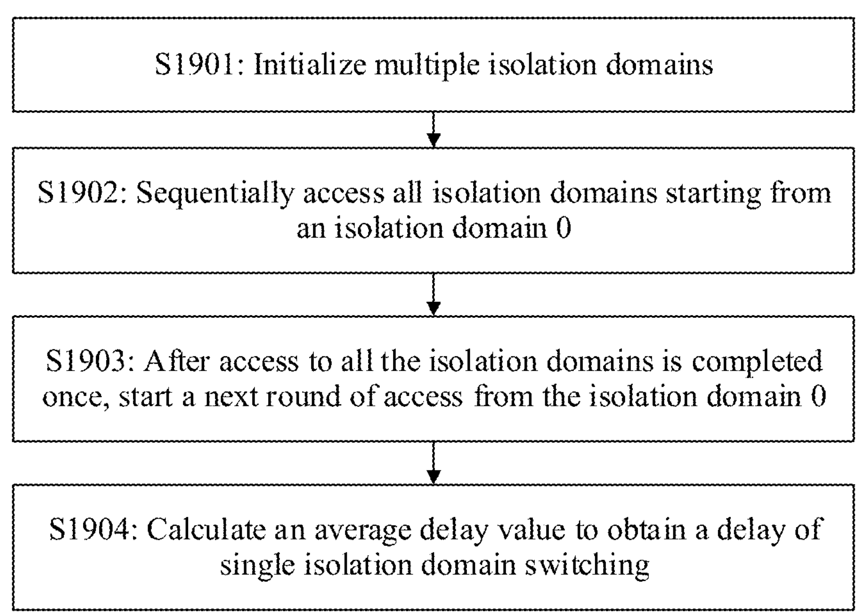
FIG. 19 is a schematic flowchart of a method for applying a memory isolation method to a microbenchmark test set according to an embodiment.

FIG. 19 is a schematic flowchart of a method 1900 for applying a memory isolation method to a microbenchmark test set. As shown in FIG. 19, the method 1900 includes the following steps.

Step S1901: Initialize multiple isolation domains.

A specific method for initializing the isolation domain has been described in detail in the embodiment shown in FIG. 8. For brevity, details are not described herein again.

Step S1902: In an initial state, sequentially access all isolation domains starting from an isolation domain 0.

Step S1903: After access to all the isolation domains is completed once, start a next round of access from the isolation domain 0.

Step S1904: Calculate an average delay value to obtain a delay of single isolation domain switching.

Each isolation domain protects 128 memory pages.

To intuitively compare switching performance of all memory isolation domain solutions, in this embodiment of this disclosure, the foregoing five memory isolation methods (MPK, libmpk, lwC, VMFUNC, and EMPK) are separately applied to the method 1900, and obtained isolation domain switching delays in different solutions are shown in Table 1.

TABLE 1

Isolation domain switching delays in different solutions (unit: clock cycle)

| Quantity of isolation domains | 2 | 3 | 4 | 8 | 16 | 32 | 64 |
|---|---|---|---|---|---|---|---|
| MPK | 28 | 29 | 28 | 30 | — | — | — |
| libmpk | 183 | 184 | 184 | 186 | ~13000 | ~13000 | ~13000 |
| lwC | ~6000 | ~6000 | ~6000 | ~6000 | ~6000 | ~6000 | ~6000 |
| VMFUNC | 353 | 350 | 831 | 830 | 834 | 849 | 830 |
| EMPK | 95 | 97 | 97 | 100 | 111 | 115 | 162 |

Table 1 shows the comparison of the isolation domain switching delays in the different solutions. It can be learned from Table 1 that, in a configuration of MPK, switching time is the shortest. However, this solution cannot support more than 15 isolation domains (in addition to an unprotected memory isolation domain).

When a quantity of isolation domains is less than 16 in libmpk, switching overheads are low (about 184 clock cycles). However, once the quantity of isolation domains is more than 16, the delay increases greatly because operations of updating page table entries of all pages and invalidating page table cache are time-consuming.

When a quantity of isolation domains is less than or equal to 3 in VMFUNC, switching overheads are about 350 clock cycles. However, if there are more than three isolation domains (four or more extended page tables in total are used), VMFUNC generates a delay of more than 800 clock cycles. This is because excessive extended page tables are used simultaneously, causing the page table cache to be invalidated.

lwC causes a delay of about 6000 clock cycles in each quantity of isolation domains.

A delay of EMPK is lower than that of other solutions except MPK, and is only 97 clock cycles when two to eight memory isolation domains are used. When the quantity of isolation domains is increased to 16 and 32, the delay of EMPK increases slightly because two extended page tables are used in this case. When more than or equal to 64 isolation domains (that is, more than or equal to four extended page tables) are used, similar to performance deterioration of VMFUNC, performance deterioration of EMPK is caused to some extent due to the page table cache invalidation. However, because the memory protection key register is still used for most isolation domain switching, a performance deterioration degree is lower than that of VMFUNC, and the delay is about 162 clock cycles.

Therefore, compared with the memory protection key technology, the method for extending a memory isolation domain provided in this disclosure can support more than 16 isolation domains. Compared with the virtual extensible technology, in the method for extending a memory isolation domain provided in this disclosure, when there are more than 16 isolation domains, a switching delay is significantly reduced. Compared with the page table switching technology and the extended page table switching technology, in the method for extending a memory isolation domain provided in this disclosure, a switching delay is reduced in all quantities of isolation domains.

Example 2

In Example 2 provided in this disclosure, the extensible memory isolation domain is applied to a process of protecting critical data in an application. In this example, critical data of two applications is protected.

The first application is a widely used server application NGINX. A type of critical data in this disclosure is an SSL key. Each link established with NGINX using hypertext transfer protocol secure (HTTPS) uses a unique key. Once the key is leaked, an attacker can decrypt data encrypted using the key. In this test, an NGINX version is 1.12.1. 300 clients concurrently send HTTPS requests to the NGINX to access files of different sizes. A server uses a single thread to process the requests.

The second application is key-value storage application Memcached. The application supports concurrent access of multiple customers. Each customer has independent storage space. When a customer stores sensitive data, the storage space of each customer can be isolated to prevent malicious users from accessing sensitive data of other customers through attacks. In this test, a Memcached version 1.6.9 is used. The client uses libMemcached to perform SET and GET operations, and the key values are 32 bytes and 256 bytes, respectively. Memcached uses four threads, and a quantity of customers is increasing.

In addition, both the foregoing two applications can use the affinity design of the isolation domain provided in embodiments of this disclosure (specific explanations of the affinity design are described in detail in the embodiment shown in FIG. 9). Details are as follows.

When the NGINX application processes multiple client requests, the NGINX application can first process requests of multiple clients that are isolated by using the same extended page table.

When the Memcached application is used to process requests from multiple clients, the requests from the clients that use the same extended page table are sent to a same thread for processing. This greatly reduces extended page table switching.

Similarly, to intuitively compare performance overheads of all memory isolation domain solutions, in this embodiment of this disclosure, the foregoing five memory isolation methods (MPK, libmpk, lwC, VMFUNC, and EMPK) are separately applied to the method provided in Example 2.

Figure 20:
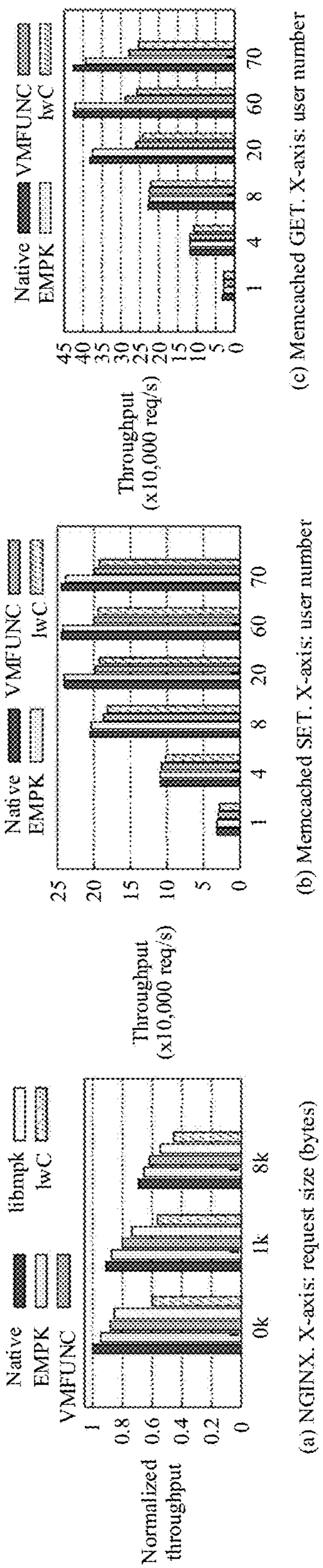
FIG. 20 is a diagram of performance of different memory isolation methods in protecting critical data in an NGINX application and a Memcached application according to an embodiment.

FIG. 20 is a diagram of performance of different memory isolation methods in protecting critical data in an NGINX application and a Memcached application.

(a) in FIG. 20 shows a result of normalizing the performance of the NGINX to the Native configuration in different memory isolation methods (a horizontal axis indicates a size of requested configuration, and a vertical axis indicates a throughput). Under size of each requested configuration, EMPK only generates extra overheads from 4.3% to 5.8%. Overheads of VMFUNC are about 11.0% to 12.4%, and are twice those of EMPK. This is because in EMPK configuration, NGINX can preferentially process requests using the same extended page table based on an affinity principle. This effectively reduces overheads. Extra overheads of libmpk are higher than those of VMFUNC (14.5% to 18.9%). This is because libmpk introduces page table modification and page table cache invalidation during switching.

(b) in FIG. 20 and (c) in FIG. 20 respectively show throughputs of SET operations and GET operations in Memcached in different memory isolation methods (a horizontal axis indicates a quantity of users, and a vertical axis indicates throughput). libmpk does not support multiple threads. Therefore, the performance of libmpk is not included in this test.

It can be learned from (b) in FIG. 20 and (c) in FIG. 20 that, when a quantity of connected users is less than or equal to 60, EMPK brings only 0.7% overhead and 2.9% overhead in SET and GET (the GET overhead is higher because a single operation is executed faster, and isolation domain switching overheads are more easily exposed). The reason why the EMPK overhead is low is that after the Memcached adapts to the affinity principle, each processing thread does not introduce extended page table switching (each of the four processing threads processes 15 isolation domains, which can be included in an extended page table). When the quantity of connected users exceeds 60, the EMPK performance slightly deteriorates because the access to the isolation domain memory may introduce extended page table switching. VMFUNC has a long switching delay and uses excessive extended page tables. As a result, the page table cache is lost, causing a maximum of 34% overhead. lwC, however, introduces the most extra overheads because the switching delay is the longest.

Therefore, in the two applications provided in this example, the method for extending a memory isolation domain provided in this embodiment of this disclosure can provide a larger throughput. This reduces a processing delay of an application in an operation process related to an isolation domain.

Example 3

In Example 3 provided in this disclosure, the extensible memory isolation domain is applied to protect a non-volatile memory data structure. The non-volatile memory data structure is usually mapped to the user-mode address space for access. If the user-mode address space is not protected, persistent data is easily damaged by a user-mode memory access error. Therefore, an intra-process isolation mechanism needs to be used to restrict access to the non-volatile memory to improve reliability. This embodiment protects the B+ tree and hash table data structures. Multiple B+ trees are configured in a B+ tree test. Each B+ tree is isolated in an isolation domain. Each tree has a maximum of 32 subnodes, and initially has 500,000 key-value pairs. Each B+ tree consumes about 128 MB memory. The test includes query and insert operations (a ratio is 1:1). A quantity of isolated B+ trees is used as an independent variable. Similarly, multiple hash tables are configured in a hash table test, and each hash table is located in an isolation domain. The test fixedly uses 32 hash tables to perform query and insert operations. The size of the inserted key-value pair gradually increases, so that the hash table consumes isolation domain memories of different sizes.

Note: In this test, the lwC performance is always lower than the VMFUNC performance. Therefore, the lwC data is omitted.

Figure 21:
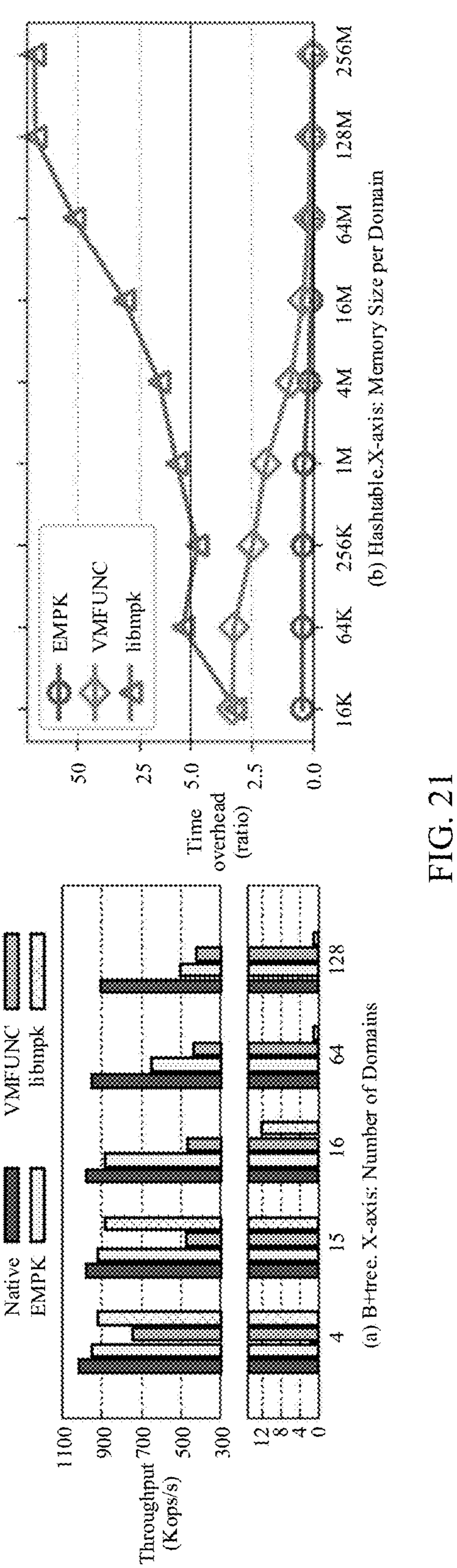
FIG. 21 is a diagram of performance of different memory isolation methods in protecting non-volatile memory data in a B+ tree and a hash table according to an embodiment.

FIG. 21 is a diagram of performance of different memory isolation methods in protecting non-volatile memory data in a B+ tree and a hash table.

(a) in FIG. 21 illustrates the performance of the B+ tree using different quantities of isolation domains. It can be learned from (a) in FIG. 21 that, when a quantity of isolation domains is less than 16, both EMPK and libmpk introduce only a small quantity of extra overheads (EMPK is up to 7%), because in this case, both EMPK and libmpk use only the protection key to switch the isolation domain. However, when a quantity of isolation domains is more than 16, libmpk will introduce serious performance overheads (reduced by 99.8% when there are 128 isolation domains) as the quantity of isolation domains increases. This is because each B+ tree consumes a large amount of memory and page table modification causes a large amount of memory access. The performance overhead of VMFUNC is always higher than that of EMPK. After the quantity of isolation domains increases, the difference decreases gradually. This is because the frequency of switching the extended page table of EMPK increases with the increase of the quantity of isolation domains when affinity is not used.

(b) in FIG. 21 illustrates the performance of a hash tree using different sizes of isolation domains. It can be learned from (b) in FIG. 21 that, EMPK keeps low extra overheads, and a performance loss is further reduced as a size of an isolation domain memory increases. This is because a delay of a single operation increases, and relative extra overheads are reduced. VMFUNC has a long switching delay. Therefore, when the isolation domain is small (that is, the single operation is fast), VMFUNC will cause obvious performance loss. libmpk is different from EMPK and VMFUNC. Because more page table entries need to be modified, the performance loss increases with the increase of the size of the isolation domain memory.

In addition, this embodiment also uses the B+ tree as a back-end storage to run the TPC-C (transaction processing performance council benchmark C) transaction benchmark test and data of each warehouse is stored in an isolation domain. In this test, each warehouse occupies about a memory of 400 MB. 7.2% of execution transactions access data in multiple warehouses. In this test, libmpk and VMFUNC do not support simultaneous access to multiple isolation domains. Therefore, the performance of EMPK is not compared with that of libmpk and VMFUNC. When EMPK uses 32 isolation domains, 3.2% of extra overheads are introduced. Most of the overheads are caused by entering the kernel to process a virtual machine exception. The full Chinese name of TPC-C may be a transaction processing performance council benchmark C.

Therefore, compared with the foregoing four solutions, the method for extending a memory isolation domain provided in this embodiment of this disclosure has better scalability. Specifically, when a size of an isolation domain memory increases, EMPK avoids serious performance losses that may be introduced in an existing solution. In addition, the existing solution does not support simultaneous access to multiple isolation domains, but EMPK supports simultaneous access to multiple isolation domains.

It should be understood that the protection key in the solution provided in this embodiment of this disclosure is a protection key of an isolation domain memory, instead of a physical protection key.

An embodiment of this disclosure further provides a computer-readable medium. The computer-readable medium stores program code, and when the computer program code is run on a computer, the computer is enabled to perform any method in FIG. 8 to FIG. 18.

An embodiment of this disclosure further provides a chip, including at least one processor and a memory. The at least one processor is coupled to the memory, and is configured to read and execute instructions in the memory, to perform any method in FIG. 8 to FIG. 18.

An embodiment of this disclosure further provides an electronic device. The electronic device includes the apparatus for extending a memory isolation domain shown in FIG. 7, to perform any method in FIG. 8 to FIG. 18.

An embodiment of this disclosure further provides an electronic device, including at least one processor and a memory. The at least one processor is coupled to the memory, and is configured to read and execute instructions in the memory, to perform any method in FIG. 8 to FIG. 18.

The foregoing embodiments may be used separately, or may be used in combination to implement different technical effect.

The method for extending a memory isolation domain provided in this disclosure may be used to accelerate inter-process communication in a microkernel. In the microkernel, a delay of inter-process communication between an application and a user-mode system service is long, and there may also be inter-process communication between system services (such as a file system and a hard disk device driver). Therefore, it may be considered that an application and a system service are deployed in an isolation domain environment provided in this disclosure, and original inter-process communication is replaced with isolation domain switching to improve overall performance. In addition, a coupling relationship between system services may be adapted to affinity in this disclosure. For example, the file system and the hard disk device driver are frequently switched, and may be deployed in a same extended page table. However, it is difficult for a network stack service to interact with the hard disk device driver, and different extended page tables may be used.

One or more of the modules or units described in this specification may be implemented by software, hardware, or a combination thereof. When any one of the foregoing modules or units is implemented by software, the software exists in a form of a computer program instruction, and is stored in the memory. The processor may be configured to execute the program instruction and implement the foregoing method procedure. The processor may include but is not limited to, at least one of a central processing unit (CPU), a microprocessor, a digital signal processor (DSP), a microcontroller unit (MCU), and a computing device used for running software like an artificial intelligence processor. Each computing device may include one or more cores used to execute software instructions to perform operations or processing. The processor may be built in a SoC (system on a chip) or an application-specific integrated circuit (ASIC), or may be an independent semiconductor chip. In addition to a core configured to execute software instructions to perform an operation or processing, the processor may further include a necessary hardware accelerator, for example, a field-programmable gate array (FPGA), a programmable logic device (PLD), or a logic circuit that implements a dedicated logic operation.

When the module or unit described in this specification is implemented by hardware, the hardware may be any one of or any combination of a CPU, a microprocessor, a DSP, an MCU, an artificial intelligence processor, an ASIC, a SoC, an FPGA, a PLD, a dedicated digital circuit, a hardware accelerator, or a non-integrated discrete device. The hardware may run necessary software to execute the foregoing method procedure or execute the foregoing method procedure without software.

When the module or unit described in this specification is implemented by software, all or some of the embodiments may be implemented in a form of a computer program product. The computer program product includes one or more computer instructions. When the computer program instructions are loaded and executed on the computer, the procedure or functions according to embodiments of this disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state disk (SSD)), or the like.

A person of ordinary skill in the art may be aware that the units and method steps described with reference to the examples in embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described function for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this disclosure, it should be understood that the disclosed system, apparatus, and method may be implemented in other manners. For example, the described apparatus embodiments are only examples. For example, division into the units is only logical function division, and may be other division in an actual implementation. For example, a plurality of units or assemblies may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure may be implemented in a form of a software product. The computer software product is stored in a storage medium, and includes several instructions for instructing a computer device (which may be a personal computer, a server, or a network device) to perform all or some of the steps of the methods described in embodiments of this disclosure. The foregoing storage medium includes any medium that can store program code, such as a USB flash drive, a removable hard disk, a read-only memory (ROM), a random-access memory (RAM), a magnetic disk, or an optical disc.

The foregoing descriptions are only specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

The invention claimed is:

1. A method comprising:

allocating memories of multiple isolation domains, wherein the multiple isolation domains are in a first correspondence with N protection keys and are in a second correspondence with M extended page tables, wherein N and M are positive integers, and wherein at least one of N or M is greater than 1, and wherein a protection key register stores an access permission corresponding to each protection key of the N protection keys;

determining, when a first application is allowed to access a memory of a first isolation domain and based on the first correspondence and the second correspondence, a first protection key and a first extended page table that correspond to the first isolation domain, wherein the multiple isolation domains comprise the first isolation domain, wherein the N protection keys comprise the first protection key, and wherein the M extended page tables comprise the first extended page table; and enabling, based on the first protection key and the first extended page table, access permission for the first isolation domain, for the first application to access the memory, wherein enabling the access permission comprises:

enabling, when the first extended page table is the same as a current extended page table, the access permission by setting the protection key register;

switching, when the first extended page table is different from the current extended page table, the current extended page table to the first extended page table; and enabling, when the first extended page table is different from the current extended page table, the access permission by setting the protection key register.

2. The method of claim 1, wherein allocating the memories comprises allocating the memory of the first isolation domain, and wherein allocating the memory of the first isolation domain comprises:

determining, based on the first correspondence and the second correspondence, the first protection key and the first extended page table, wherein when the first extended page table already exists, allocating the memory of the first isolation domain further comprises:

establishing, in the first extended page table, a mapping to the memory; and setting a protection key of the memory in the first extended page table, wherein, when the first extended page table does not exist, allocating the memory of the first isolation domain further comprises:

initializing the first extended page table;

establishing, in an initialized first extended page table, a mapping to the memory; and setting a protection key of the memory in the initialized first extended page table, and wherein the first extended page table is in a guest kernel.

3. The method of claim 2, further comprising accessing the memory when a virtual machine exception is not triggered to enter the guest kernel.

4. The method of claim 2, further comprising:

switching, in the guest kernel, when a virtual machine exception is triggered to enter the guest kernel, and when the memory is allowed to be accessed, the current extended page table and a corresponding protection key to the first extended page table and the first protection key; and accessing the memory.

5. The method of claim 4, further comprising determining whether the memory of the first isolation domain is allowed to be accessed by:

generating and maintaining an accessible isolation domain list; and determining, based on the accessible isolation domain list, whether the memory of the first isolation domain is allowed to be accessed.

6. The method of claim 1, further comprising canceling, when access to the memory ends, the access permission for the first isolation domain by setting the protection key register.

7. The method of claim 1, further comprising initializing the first isolation domain before allocating the memories.

8. The method of claim 7, wherein initializing the first isolation domain comprises:

generating an identifier (ID) of the first isolation domain;

allocating the first protection key and the first extended page table to the ID; and recording a mapping from the ID to the first protection key and the first extended page table.

9. The method of claim 8, wherein allocating the first protection key and the first extended page table to the ID comprises:

allocating, when the current extended page table is capable of accommodating a new protection key, the current extended page table and an unused protection key to the ID; and allocating, when the current extended page table is incapable of accommodating a new protection key, a new extended page table and an unused protection key to the ID.

10. The method of claim 8, wherein the method further comprises releasing the memory of the first isolation domain.

11. The method of claim 10, wherein releasing the memory comprises:

determining, based on the first correspondence and the second correspondence, a protection key corresponding to the memory and an extended page table corresponding to the first isolation domain;

removing the protection key from the extended page table; and removing the mapping to the memory from the extended page table.

12. The method of claim 8, wherein the method further comprises releasing the first isolation domain, and wherein releasing the first isolation domain comprises:

determining, based on the first correspondence and the second correspondence, a protection key corresponding to the first isolation domain and an extended page table corresponding to the first isolation domain;

marking the protection key as being in an unallocated state; and releasing the ID of the first isolation domain.

13. The method of claim 1, wherein the method further comprises releasing the first isolation domain.

14. The method of claim 1, wherein the multiple isolation domains share one protection key and correspond to different extended page tables.

15. An electronic device comprising:

one or more memories configured to store one or more computer programs comprising instructions; and one or more processors coupled to the one or more memories and configured to execute the instructions to cause the electronic device to:

allocate memories of multiple isolation domains, wherein the multiple isolation domains are in a first correspondence with N protection keys and a second correspondence with M extended page tables, wherein N and M are positive integers, and wherein at least one of N or M is greater than 1, and wherein a protection key register stores an access permission corresponding to each protection key of the N protection keys;

determine, when a first application is allowed to access a memory of a first isolation domain, and based on the first correspondence and the second correspondence, a first protection key and a first extended page table that correspond to the first isolation domain, wherein the multiple isolation domains comprise the first isolation domain, wherein the N protection keys comprise the first protection key, and wherein the M extended page tables comprise the first extended page table; and enable, based on the first protection key and the first extended page table, access permission for the first isolation domain, for the first application to access the memory, wherein to enable the access permission, the one or more processors are configured to cause the electronic device to:

enable, when the first extended page table is the same as a current extended page table, the access permission by setting the protection key register;

switch, when the first extended page table is different from a current extended page table, the current extended page table to the first extended page table; and enable, when the first extended page table is different from the current extended page table, the access permission by setting the protection key register.

16. The electronic device of claim 15, wherein the one or more processors are further configured to cause the electronic device to allocate the memories of multiple isolation domains by allocating the memory, and wherein the one or more processors are further configured to cause the electronic device to allocate the memory by:

determining, based on the first correspondence and the second correspondence, the first protection key corresponding to the first isolation domain and the first extended page table, wherein, when the first extended page table already exists, the one or more processors are further configured to cause the electronic device to allocate the memory of the first isolation domain by:

establishing, in the first extended page table, a first mapping to the memory; and setting a protection key of the memory in the first extended page table, wherein, when the first extended page table does not exist, the one or more processors are further configured to cause the electronic device to allocate the memory of the first isolation domain by:

initializing the first extended page table;

establishing, in an initialized first extended page table, a second mapping to the memory; and setting a protection key of the memory in the initialized first extended page table, and wherein the first extended page table is in a guest kernel.

17. The electronic device of claim 15, wherein the one or more processors are further configured to cause the electronic device to cancel, when access to the memory ends, the access permission by setting the protection key register.

18. A chip comprising:

one or more memories configured to store instructions; and one or more processors coupled to the one or more memories and configured to execute the instructions to cause the chip to:

allocate memories of multiple isolation domains, wherein the multiple isolation domains are in a first correspondence with N protection keys and a second correspondence with M extended page tables, wherein N and M are positive integers, and wherein at least one of N or M is greater than 1, and wherein a protection key register stores an access permission corresponding to each protection key of the N protection keys;

determine, when a first application is allowed to access a memory of a first isolation domain, and based on the first correspondence and the second correspondence, a first protection key and a first extended page table that correspond to the first isolation domain, wherein the multiple isolation domains comprise the first isolation domain, wherein the N protection keys comprise the first protection key, and wherein the M extended page tables comprise the first extended page table; and enable, based on the first protection key and the first extended page table, access permission for the first isolation domain, for the first application to access the memory, wherein to enable the access permission, the one or more processors are configured to cause the chip to:

enable, when the first extended page table is the same as a current extended page table, the access permission by setting the protection key register;

switch, when the first extended page table is different from a current extended page table, the current extended page table to the first extended page table; and enable, when the first extended page table is different from the current extended page table, the access permission by setting the protection key register.

* * * * *